United States Patent
Kim et al.

(10) Patent No.: US 11,275,918 B2
(45) Date of Patent: Mar. 15, 2022

(54) FINGERPRINT VERIFICATION METHOD AND APPARATUS

(71) Applicant: SAMSUNG ELECTRONICS CO., LTD., Suwon-si (KR)

(72) Inventors: Joohyeon Kim, Seoul (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/456,923

(22) Filed: Jun. 28, 2019

(65) Prior Publication Data

US 2020/0218868 A1     Jul. 9, 2020

(30) Foreign Application Priority Data

Jan. 3, 2019   (KR) .................. 10-2019-0000675

(51) Int. Cl.
*G06K 9/00* (2006.01)
*G07C 9/25* (2020.01)

(52) U.S. Cl.
CPC ....... *G06K 9/0002* (2013.01); *G06K 9/00067* (2013.01); *G06K 9/00087* (2013.01); *G07C 9/257* (2020.01)

(58) Field of Classification Search
CPC .. G06F 21/32; G06K 9/00026; G06K 9/0008; G06K 9/0004; G06K 9/0002
See application file for complete search history.

(56) References Cited

U.S. PATENT DOCUMENTS

| | | | | |
|---|---|---|---|---|
| 7,616,787 B2* | 11/2009 | Boshra | ............... | G06K 9/00026 382/124 |
| 9,613,252 B1* | 4/2017 | Chiang | ................ | G06K 9/3275 |
| 10,032,062 B2 | 7/2018 | Kim et al. | | |
| 2003/0068072 A1* | 4/2003 | Hamid | ................. | G06K 9/0002 382/124 |
| 2003/0169910 A1* | 9/2003 | Reisman | ............ | G06K 9/00087 382/124 |
| 2006/0078177 A1* | 4/2006 | Niinuma | ............... | G06K 9/6807 382/124 |
| 2016/0034744 A1* | 2/2016 | Chiang | .............. | G06K 9/00073 382/125 |
| 2016/0314337 A1* | 10/2016 | Suh | ..................... | G06K 9/00093 |
| 2017/0004350 A1* | 1/2017 | Clausen | ................. | G06F 16/51 |
| 2018/0330147 A1 | 11/2018 | Kim et al. | | |

FOREIGN PATENT DOCUMENTS

| | | |
|---|---|---|
| CN | 107622224 A | 1/2018 |
| JP | 4877392 B2 | 2/2012 |
| JP | 2016-173669 A | 9/2016 |

(Continued)

*Primary Examiner* — Yuzhen Shen
(74) *Attorney, Agent, or Firm* — Sughrue Mion, PLLC

(57) ABSTRACT

A fingerprint verification method and apparatus are provided. The fingerprint verification method includes performing a first matching between a fingerprint image and a first registered fingerprint image; based on a result of the first matching, performing a second matching between the fingerprint image and a second registered fingerprint image, the second registered fingerprint image being different from the first registered fingerprint image; and verifying the fingerprint based on the result of the first matching and a result of the second matching.

19 Claims, 17 Drawing Sheets

(56) References Cited

FOREIGN PATENT DOCUMENTS

| KR | 10-2016-0126842 A | 11/2016 |
| KR | 10-2017-0003361 A | 1/2017 |
| KR | 10-1872366 B1 | 6/2018 |
| KR | 10-2018-0086086 A | 7/2018 |
| KR | 10-2018-0086087 A | 7/2018 |
| KR | 10-2018-0105035 A | 9/2018 |

* cited by examiner

| Index | Registered fingerprint image region coordinates | Global region coordinates | Transform parameters $(\sin\theta, \cos\theta, T_X, T_Y)$ |
|---|---|---|---|
| Registered fingerprint image 1 | (0,0), (180,0) (0,80), (180,80) | $(x_{11},y_{11}), (x_{12},y_{12})$ $(x_{13},y_{13}), (x_{14},y_{14})$ | (0.7, 0.7, 10, 50) |
| Registered fingerprint image 2 | (0,0), (180,0) (0,80), (180,80) | $(x_{21},y_{21}), (x_{22},y_{22})$ $(x_{23},y_{23}), (x_{24},y_{24})$ | (0.8, 0.6, 15, 60) |
| ⋮ | ⋮ | ⋮ | ⋮ |

FINGERPRINT VERIFICATION METHOD AND APPARATUS

CROSS-REFERENCE TO RELATED APPLICATION

This application claims priority from Korean Patent Application No. 10-2019-0000675 filed on Jan. 3, 2019, in the Korean Intellectual Property Office, the disclosure of which is incorporated herein by reference in its entirety.

BACKGROUND

1. Field

Methods and apparatuses consistent with example embodiments relate to fingerprint verification.

2. Description of Related Art

Biometric authentication is used to authenticate users by using the users' biological characteristics, such as, fingerprints, irises, voices, facial features, blood vessels, or other biological characteristics. The biological characteristics used in user authentication are unique for each user and rarely change during the lifetime of a user. Further, the biological characteristics pose a low risk of theft or imitation, providing high security authentication. Unlike fobs and other external objects, individuals do not need to exert any efforts to carry and use the biological characteristics. Fingerprint verification is widely used due to convenience, security, and economic efficiency. Fingerprint verification techniques may include registering and storing a fingerprint image to be used for fingerprint verification, comparing a fingerprint image input from a user requesting user authentication to a previously registered fingerprint image, determining whether to authenticate the user based on a result of the comparing, and authenticating the user to be a registered user when the result of the comparing satisfies a preset condition.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a method of verifying a fingerprint, the method including performing a first matching between a fingerprint image and a first registered fingerprint image; based on a result of the first matching, performing a second matching between the fingerprint image and a second registered fingerprint image, the second registered fingerprint image being different from the first registered fingerprint image; and verifying the fingerprint based on the result of the first matching and a result of the second matching.

The performing the first matching includes performing a first alignment between the fingerprint image and the first registered fingerprint image, determining a first matching region between the fingerprint image and the first registered fingerprint image based on a result of the first alignment, and obtaining the result of the first matching based on at least one of a size of the first matching region and a similarity between the fingerprint image and the first registered fingerprint image corresponding to the first matching region.

The performing the first alignment may include determining at least one of translation information and rotation information from the fingerprint image and the first registered fingerprint image based on a frequency information-based matching method, and performing the first alignment between the fingerprint image and the first registered fingerprint image based on the at least one of the translation information and the rotation information.

The performing the second matching may include performing a second alignment between the fingerprint image and the second registered fingerprint image, determining a second matching region between the fingerprint image and the second registered fingerprint image based on a result of the second alignment, and obtaining the result of the second matching based on at least one of a size of the second matching region and a similarity between the fingerprint image and the second registered fingerprint image corresponding to the second matching region.

According to an aspect of another example embodiment, there is provided a non-transitory computer-readable storage medium storing instructions that are executable by a processor to perform a method of verifying a fingerprint, the method including: performing a first matching between a fingerprint image and a first registered fingerprint image; based on a result of the first matching, performing a second matching between the fingerprint image and a second registered fingerprint image, the second registered fingerprint image being different from the first registered fingerprint image; and verifying the fingerprint based on the result of the first matching and a result of the second matching.

According to an aspect of still another example embodiment, there is provided an apparatus for verifying a fingerprint, the apparatus including a sensor configured to obtain a fingerprint image; and a processor configured to verify the fingerprint based on the fingerprint image, wherein the processor is further configured to: perform a first matching between the fingerprint image and a first registered fingerprint image; based on a result of the first matching, perform a second matching between the fingerprint image and a second registered fingerprint image, the second registered fingerprint image being different from the first registered fingerprint image; and verify the fingerprint based on the result of the first matching and a result of the second matching.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
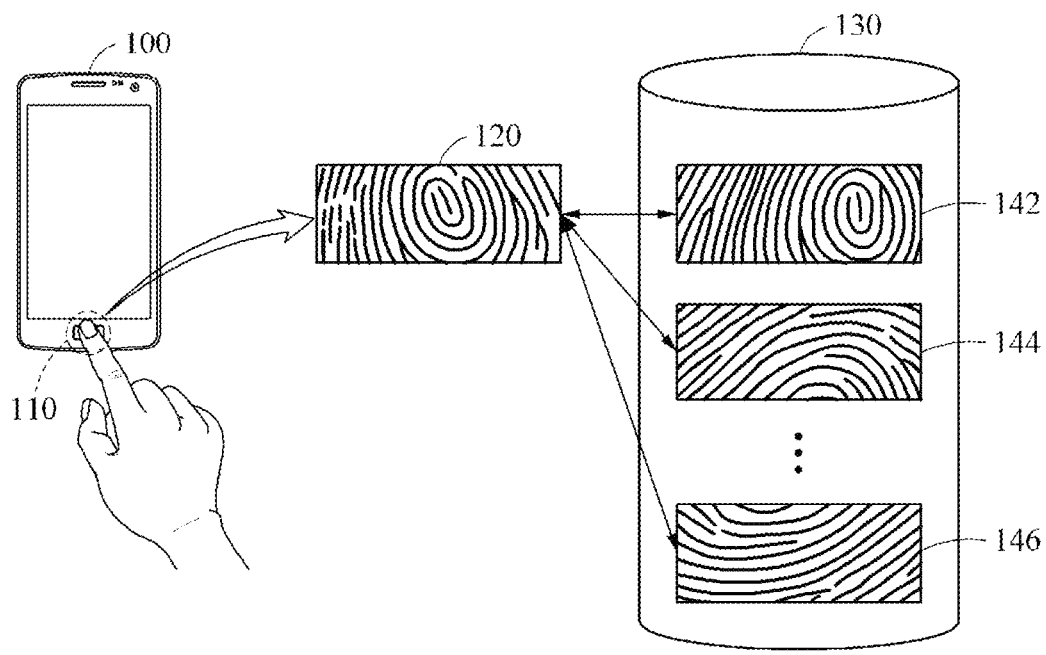
FIGS. 1 and 2 are diagrams illustrating an example of a fingerprint verification method using a partial fingerprint image detected by a sensor.

Example embodiments will now be described in detail with reference to the accompanying drawings, wherein like reference numerals refer to the like elements throughout.

The following structural or functional descriptions are exemplary to merely describe the example embodiments, and the scope of the example embodiments is not limited to the descriptions provided in the present disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Figure 2:
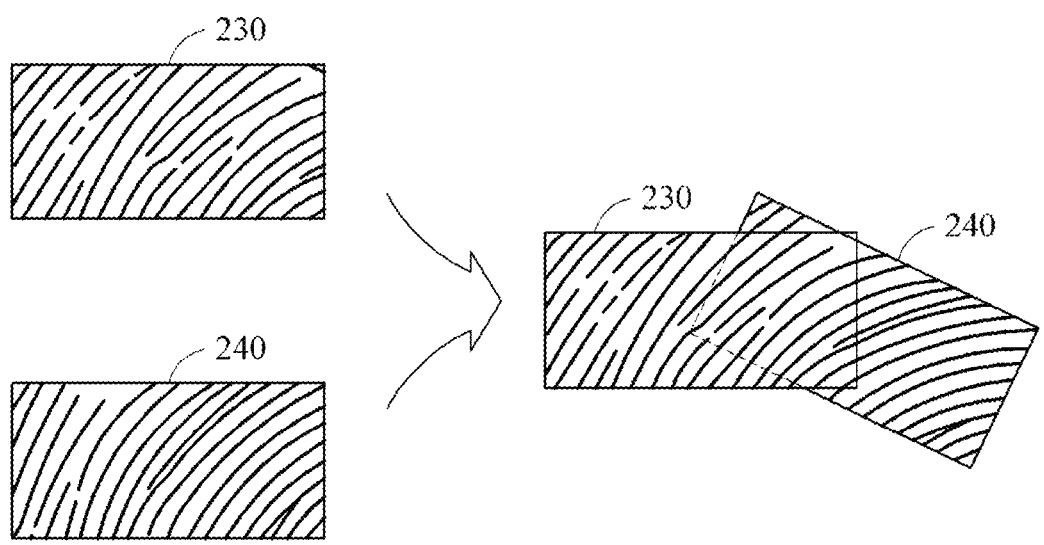

FIGS. 1 and 2 are diagrams illustrating an example of a fingerprint verification method using a partial fingerprint image detected by a sensor.

Fingerprint verification refers to a verification method used to determine whether a user who attempts at verification is a valid user, and verify a valid user in applications, such as, for example, user log-in, payment services, financial services, and access control. Referring to FIG. 1, a fingerprint verification apparatus that performs such a verification method is included in, or represented by, a computing apparatus 100. The computing apparatus 100 may include various types of products, such as, for example, a smartphone, a wearable smart device, a tablet personal computer (tablet), a desktop, a laptop, a netbook, a personal digital assistant (PDA), a set-top box, a home appliance, a biometrics-based door lock, a security device, a smart vehicle, and other consumer electronics/information technology (CE/IT) devices or any other devices capable of wireless communication or network communication consistent with those disclosed herein.

In the example illustrated in FIG. 1, the computing apparatus 100 analyzes a fingerprint pattern of a fingerprint image 120 that is sensed through a sensor 110, and determines whether a user attempting access the computing apparatus 100 is a valid user. For example, when the user inputs a fingerprint of the user to cancel a lock state of the computing apparatus 100, the computing apparatus 100 compares the fingerprint image 120 obtained through the sensor 110 to at least one of registered fingerprint images 142, 144, and 146 stored in a database (DB) 130, and determines whether to cancel the lock state of the computing apparatus 100 based on a result of the comparing. A fingerprint image input for the fingerprint verification will be hereinafter referred to as a query fingerprint image. The DB 130 may store therein registered fingerprint images of one or more fingers. The term "fingerprint (image) registration" or "registering a fingerprint image" used herein is construed as registering or enrolling a fingerprint (image) in a DB, and the term "image alignment" or "performing an alignment" used herein is construed as a process of aligning images and may have a same meaning as a technical term "image registration" generally known in the technical field to which the example embodiments described herein pertain.

In an example, a valid user registers, in advance, fingerprint information of the valid user in the computing apparatus 100 in a fingerprint registration process, and the computing apparatus 100 stores the fingerprint information registered by the valid user in the DB 130 or at an external storage medium, such as, for example, a cloud storage. The registered fingerprint information may be stored in a form of registered fingerprint image. In the fingerprint registration process, the user registers a plurality of fingerprint images, for example, the fingerprint images 142, 144, and 146 as illustrated. In a fingerprint verification process, the computing apparatus 100 compares the fingerprint image 120 obtained through the sensor 110 to the registered fingerprint images 142, 144, and 146. Here, a size of the fingerprint image 120 and sizes of the registered fingerprint images 142, 144, and 146 are determined by a sensing region of the sensor 110. Due to a limited size of the sensing region of the sensor 110, information associated with only a partial fingerprint region may be included in the fingerprint image 120 obtained by the sensor 110 and in the registered fingerprint images 142, 144, and 146.

Recently, a sensor has become smaller in size to more completely refine a design of a computing apparatus and reduce costs used to manufacture the computing apparatus. Thus, the fingerprint verification process may need to be performed using a smaller region of a fingerprint image.

Thus, the fingerprint image 120 and the registered fingerprint images 142, 144, and 146 obtained by the sensor 110 having the limited sensing region may not include features that are sufficient to identify a fingerprint. In such a case, by performing fingerprint verification by comparing, one to one, a fingerprint image and a registered fingerprint image that have insufficient features, an undesirable result, for example, false acceptance, may occur. For example, as illustrated in FIG. 2, when a fingerprint pattern of a fingerprint image 230 obtained through a sensor and a fingerprint pattern of a registered fingerprint image 240 are relatively less identifiable, a similarity between the fingerprint image 230 and the registered fingerprint image 240 may be determined to be high due to the simple fingerprint patterns, and thus false acceptance is highly likely to occur.

Such false acceptance may adversely affect an accuracy or a recognition rate in fingerprint verification, and thus it is desirable to prevent the false acceptance. Example embodiments to be described hereinafter may be provided to perform fingerprint verification more accurately and rapidly.

Figure 3A:
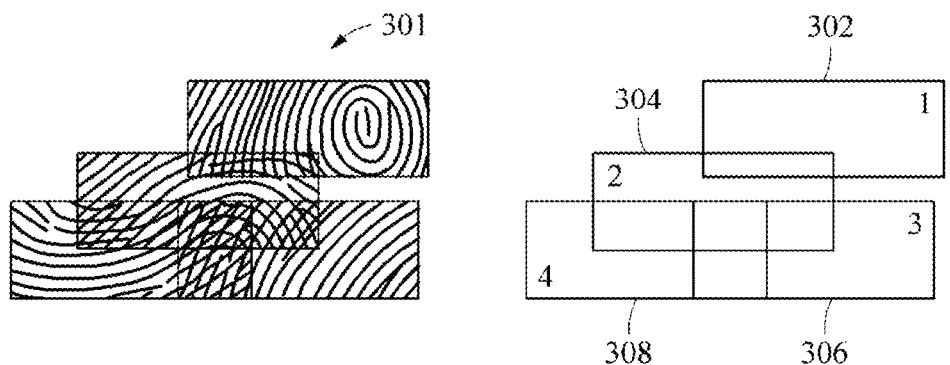
FIGS. 3A and 3B are diagrams illustrating an example of a fingerprint verification method according to an example embodiment.
Figure 3B:
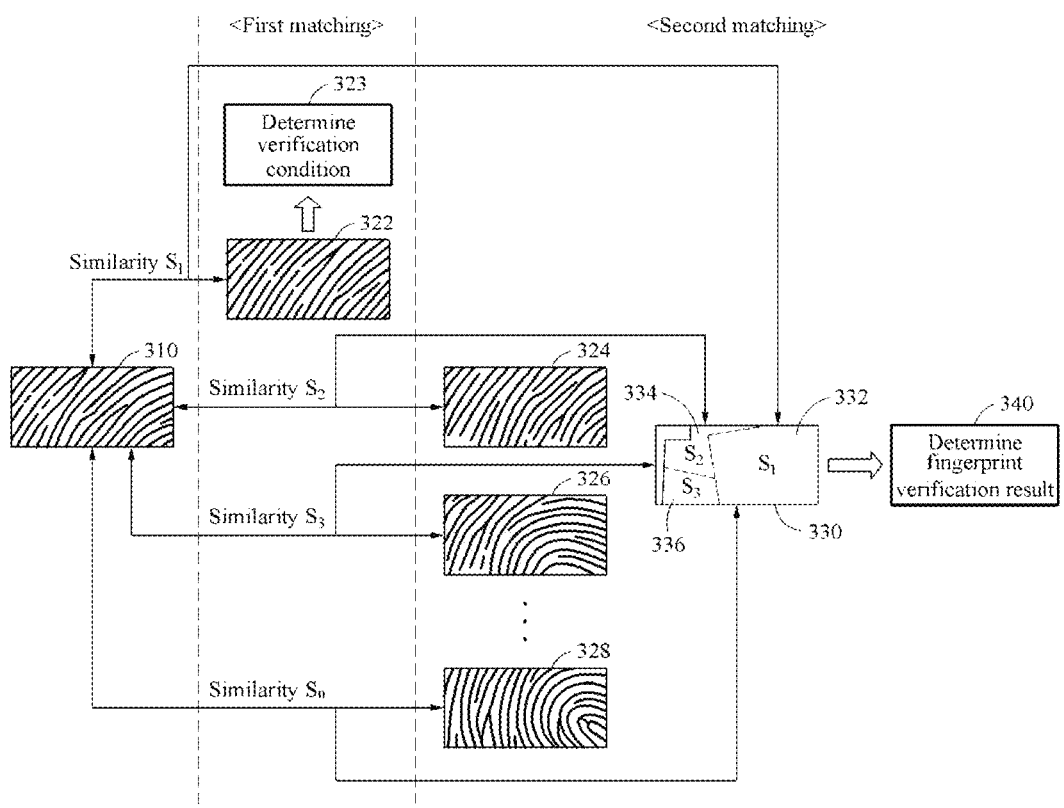

FIGS. 3A and 3B are diagrams illustrating an example of a fingerprint verification method according to an example embodiment.

A fingerprint verification method according to an example embodiment may include performing first matching between a query fingerprint image obtained through a sensor and one of registered fingerprint images. When a partial region of the query fingerprint image is not matched in the first matching, the fingerprint verification method may include performing second matching using at least one of remaining registered fingerprint images.

In the second matching, the fingerprint verification method may include determining at least one registered fingerprint image among the registered fingerprint images based on a matching relationship between the query fingerprint image and the registered fingerprint images that are aligned through image registration, and performing the second matching based on a result of the determining.

Referring to FIG. 3A, a fingerprint image 301 is obtained by aligning registered fingerprint images 302, 304, 306, and 308 which correspond to different portions of a fingerprint of a user. A fingerprint verification apparatus according to an example embodiment aligns the registered fingerprint images 302, 304, 306, and 308 into a form of the fingerprint image 301 based on overlapping regions of the registered fingerprint images 302, 304, 306, and 308, and stores positional information of the aligned registered fingerprint images 302, 304, 306, and 308. A region in a coordinate system or a coordinate system region in which aligned registered fingerprint images, for example, the aligned registered fingerprint images 302, 304, 306, and 308, are registered will be hereinafter referred to as a global region in the coordinate system or a global coordinate system region.

The fingerprint verification apparatus determines positional information of a query fingerprint image based on a positional relationship among the registered fingerprint images 302, 304, 306, and 308, and determines a registered fingerprint image on which second matching is to be performed based on a result of the determining. Hereinafter, the second matching will be described later in detail with reference to the accompanying drawings.

Referring to FIG. 3B, the fingerprint verification apparatus performs fingerprint verification based on a similarity between a query fingerprint image 310 input for the fingerprint verification and each of a plurality of registered fingerprint images 322, 324, 326, and 328. The fingerprint verification apparatus performs the fingerprint verification based on a size of a matching region between the query fingerprint image 310 and each of the registered fingerprint images 322, 324, 326, and 328, in addition to the similarity between the query fingerprint image 310 and each of the registered fingerprint images 322, 324, 326, and 328.

For example, the fingerprint verification apparatus determines the registered fingerprint image 322 to be a first registered fingerprint image on which first matching is to be performed, the registered fingerprint image 322 having a largest region overlapping the query fingerprint image 310 among the registered fingerprint images 322, 324, 326, and 328. The first matching refers to one-to-one matching between the query fingerprint image 310 and the first registered fingerprint image 322.

The fingerprint verification apparatus determines whether a preset verification condition is satisfied based on a result of the first matching, in operation 323. For example, the verification condition is satisfied when a score, which is determined based on a size of a first matching region 332 determined through the first matching and based on a similarity S1 corresponding to the first matching region 332 (or a similarity S1 between the query fingerprint image 310 and the first registered fingerprint image 322 at regions corresponding to the first matching region 332), exceeds a preset threshold value (e.g., a first threshold value). When the verification condition is satisfied, the fingerprint verification apparatus determines that verification of the query fingerprint image 310 is successful. The verification condition is not limited to the example verification condition described above, and may include any other conditions determining a success or a failure of the verification based on a size of a matching region and a similarity corresponding to the matching region.

However, when the score determined based on the size of the first matching region 332 and the similarity S1 corresponding to the first matching region 332 is less than a preset threshold value (e.g., a second threshold value), the fingerprint verification apparatus determines that a verification failure condition is satisfied and that the fingerprint verification is unsuccessful.

When both the verification condition and the verification failure condition are not satisfied in the first matching, the fingerprint verification apparatus performs second matching. The second matching refers to matching performed based on at least one of remaining registered fingerprint images 324, 326, and 328 with respect to a region in the query fingerprint image 310 which is not matched in the first matching.

The fingerprint verification apparatus determines, among the remaining registered fingerprint images 324, 326, and 328, second registered fingerprint images 324 and 326 overlapping the region in the query fingerprint image 310 which is not matched in the first matching. The fingerprint verification apparatus then performs the second matching between the query fingerprint image 310 and the second registered fingerprint images 324 and 326.

The fingerprint verification apparatus determines the second registered fingerprint images 324 and 326 based on a positional relationship among the registered fingerprint images 322, 324, 326, and 328 determined through an alignment described above with reference to FIG. 3A. For example, the fingerprint verification apparatus determines the second registered fingerprint images 324 and 326 based on a positional relationship between the query fingerprint image 310 and the first registered fingerprint image 322 determined in the first matching, and based on a positional relationship between the first registered fingerprint image 322 and the remaining registered fingerprint images 324, 326, and 328. That is, the second registered fingerprint images 324 and 326 overlapping the query fingerprint image 310 are determined based on the positional relationship between the query fingerprint image 310 and the first registered fingerprint image 322 and the positional relationship between the first registered fingerprint image 322 and the remaining registered fingerprint images 324, 326, and 328. Hereinafter, a method of determining a second registered fingerprint image among registered fingerprint images will be described in detail with reference to FIG. 10.

The fingerprint verification apparatus performs the second matching between the query fingerprint image 310 and the second registered fingerprint images 324 and 326.

The fingerprint verification apparatus determines a result of the fingerprint verification based on a result of the first matching and a result of the second matching.

A matching region-based similarity 330 visually represents a similarity for each matching region. The matching region-based similarity 330 is provided in a form in which respective similarities between the query fingerprint image 310 and the first registered fingerprint image 322, and between the query fingerprint image 310 and the second registered fingerprint images 324 and 326 are integrated and stored. An example of determining a matching region-based similarity will be described hereinafter.

As illustrated, the fingerprint verification apparatus performs the second matching first on the second registered fingerprint image 324 having a greater matching region, between the second registered fingerprint images 324 and 326. The fingerprint verification apparatus determines a second matching region 334 and a similarity $S_2$ that correspond to the second registered fingerprint image 324 through the second matching. The fingerprint verification apparatus assigns the similarity $S_1$ to the first matching region 332 and the similarity $S_2$ to the second matching region 334, in an entire region corresponding to the query fingerprint image 310. The fingerprint verification apparatus determines a result of the fingerprint verification based on whether a score determined based on the matching region-based similarity 330 and each matching region size satisfies a preset fingerprint verification condition in operation 340. When the score does not satisfy the fingerprint verification condition, the fingerprint verification apparatus performs matching between the query fingerprint image 310 and the second registered fingerprint image 326 which is a remaining fingerprint image between the second registered fingerprint images 324 and 326. In an example, a similarity of each matching region (or a matching region-based similarity), and a size of each matching region on which calculation of such score is based may be factors used to determine whether fingerprint verification is successful. The fingerprint verification apparatus determines a second matching region 336 between the query fingerprint image 310 and the second registered fingerprint image 326 and a similarity $S_3$, and updates the previously determined matching region-based similarity 330 based on the second matching region 336 and the similarity $S_3$. The fingerprint verification apparatus determines a result of the fingerprint verification based on a score determined based on the updated matching region-based similarity 330 and each matching region size. When the score does not satisfy the preset condition, the fingerprint verification apparatus determines that the fingerprint verification of the query fingerprint image 310 is unsuccessful because there is no registered fingerprint image overlapping the query fingerprint image 310 other than the second registered fingerprint images 324 and 326.

However, when the score calculated through the updating based on the similarity $S_3$ satisfies the preset fingerprint verification condition, the fingerprint verification apparatus determines that the fingerprint verification of the query fingerprint image 310 is successful in operation 340. As described, since a result of the fingerprint verification is determined each time the matching region-based similarity 330 is updated, only a portion of registered fingerprint images, not all of the registered fingerprint images, may be compared to the query fingerprint image 310, and thus processes of the fingerprint verification may be more rapidly performed and completed.

The foregoing example focuses on determining a fingerprint verification result each time a matching region-based similarity is updated. However, according to an example, the fingerprint verification result may be determined at a last stage. For example, matching regions and similarities between the query fingerprint image 310 and the registered fingerprint images 322, 324, and 326 are all determined first, and then a fingerprint verification result is determined after a matching region-based similarity is determined based on each matching region size and a similarity assigned to each matching region.

Whether the fingerprint verification is successful is not determined based solely on a similarity between the query fingerprint image 310 and a single registered fingerprint image, but determined based on a matching region-based similarity determined by comparing the query fingerprint image 310 to registered fingerprint images in sequential order. Thus, a probability of false acceptance occurring may be reduced, and an accuracy or a recognition rate in the fingerprint verification may be improved.

Figure 4:
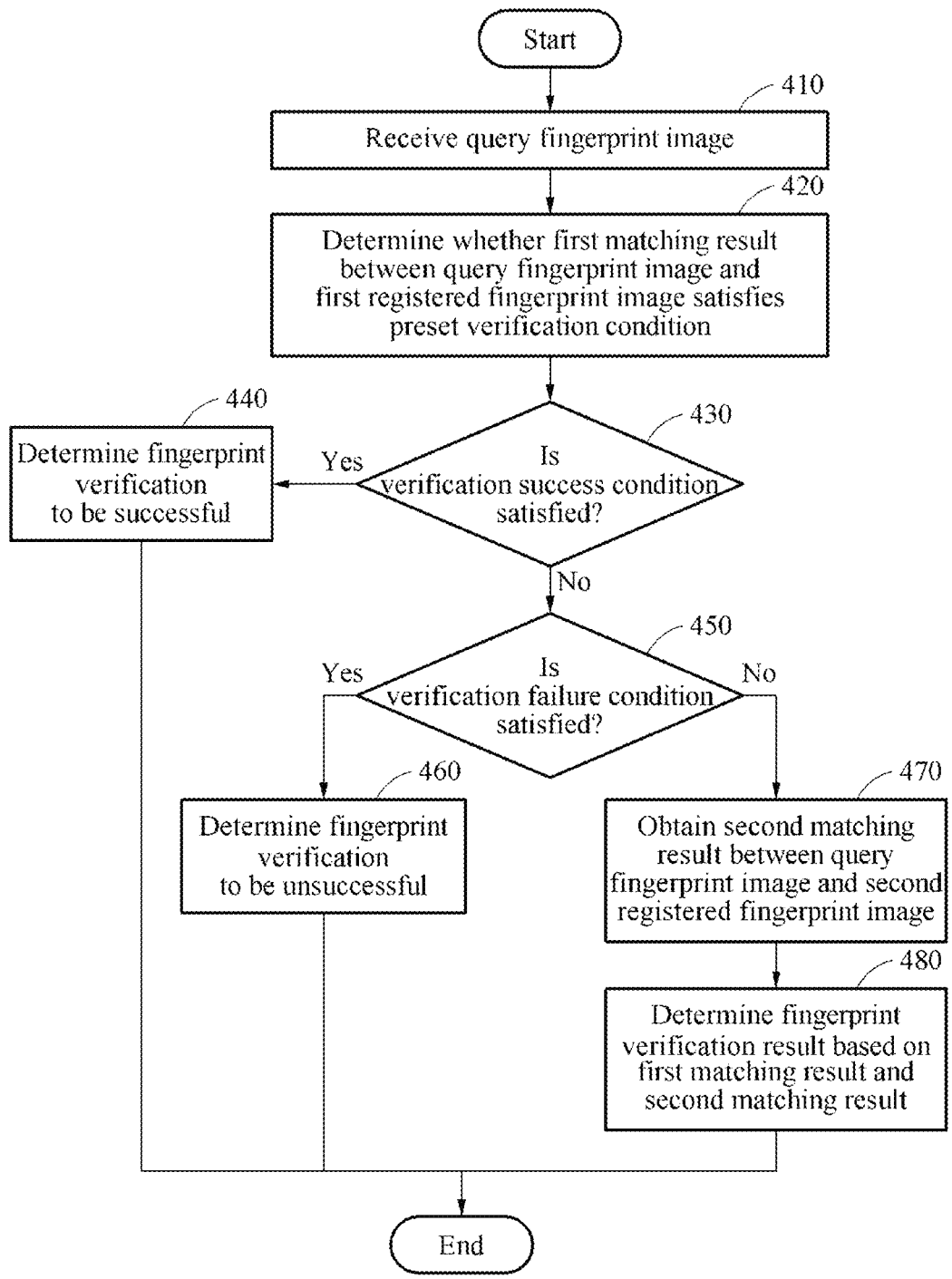
FIG. 4 is a flowchart illustrating an example of a fingerprint verification method according to an example embodiment.

FIG. 4 is a flowchart illustrating an example of a fingerprint verification method according to an example embodiment.

Referring to FIG. 4, in operation 410, a fingerprint verification apparatus receives a query fingerprint image. The query fingerprint image refers to a fingerprint image which is a target for fingerprint verification, and may be obtained through a sensor, for example.

In operation 420, the fingerprint verification apparatus determines whether a first matching result of matching between the query fingerprint image and a first registered fingerprint image satisfies a preset verification condition. The first matching result refers to a result obtained from first matching between the query fingerprint image and the first registered fingerprint image, and the first matching refers to one-to-one matching performed between the query fingerprint image and the first registered fingerprint image. The first registered fingerprint image may be determined to be a registered fingerprint image having a largest region overlapping the query fingerprint image among registered fingerprint images.

To perform the first matching, the fingerprint verification apparatus performs a first alignment between the query fingerprint image and the first registered fingerprint image.

For example, the fingerprint verification apparatus determines at least one of translation information or rotation information from the query fingerprint image and the first registered fingerprint image based on a frequency information-based matching method, and performs the first alignment between the query fingerprint image and the first registered fingerprint image based on the determined information.

The fingerprint verification apparatus determines a first matching region based on a result of the first alignment between the query fingerprint image and the first registered fingerprint image. The fingerprint verification apparatus obtains the first matching result by calculating a similarity corresponding to the first matching region. The fingerprint verification apparatus calculates a score based on a size of the first matching region and the similarity corresponding to the first matching region that are determined based on the first matching result, and determines whether the calculated score satisfies the verification condition. In the example as illustrated in FIG. 4, the verification condition may include a verification success condition used to determine whether the fingerprint verification is successful, and a verification failure condition used to determine whether the fingerprint verification is unsuccessful.

In operation 430, the fingerprint verification apparatus determines whether the verification success condition is satisfied. In operation 440, when the verification success condition is determined to be satisfied in operation 430, the fingerprint verification apparatus determines the fingerprint verification to be successful.

In operation 450, when the verification success condition is determined not to be satisfied in operation 430, the fingerprint verification apparatus determines whether the verification failure condition is satisfied. For example, the verification failure condition may be a condition indicating that the calculated score is less than or equal to a preset threshold value. In operation 460, when the verification failure condition is determined to be satisfied in operation 450, the fingerprint verification apparatus determines the fingerprint verification to be unsuccessful.

In operation 470, when the verification failure condition is determined not to be satisfied in operation 450, the fingerprint verification apparatus obtains a second matching result of matching between the query fingerprint image and a second registered fingerprint image.

The fingerprint verification apparatus determines, to be the second registered fingerprint image, a registered fingerprint image overlapping a region of the query fingerprint image which is not matched through the first matching. The second matching result refers to a result obtained from second matching between the query fingerprint image and the second registered fingerprint image. Through the second matching, the fingerprint verification apparatus determines a second matching region between the query fingerprint image and the second registered fingerprint image, and determines a similarity corresponding to the second matching region. The second matching region refers to a region that matches the second registered fingerprint image among regions excluding the first matching region of the query fingerprint image.

Hereinafter, a method of determining a second registered fingerprint image and performing second matching will be described later in detail with reference to FIG. 10.

In operation 480, the fingerprint verification apparatus determines a fingerprint verification result based on the first matching result and the second matching result.

The fingerprint verification apparatus obtains information associated with the first matching region and the similarity corresponding to the first matching region based on the first matching result. In addition, the fingerprint verification apparatus obtains information associated with the second matching region and the similarity corresponding to the second matching region based on the second matching result. The fingerprint verification apparatus determines a score based on each matching region size and a similarity for each matching region, and determines the fingerprint verification result based on the determined score. The score is a reference value used to calculate the fingerprint verification result. For example, the larger the matching region and the greater the similarity, the greater the score.

As described above with reference to FIGS. 3A and 3B, the fingerprint verification apparatus may determine a fingerprint verification result after matching is performed on all second registered fingerprint images, or determine the fingerprint verification result after matching is performed on each of the second registered fingerprint images. For example, in a case in which a fingerprint verification result is determined repeatedly and verification of the query fingerprint image is not successful even after all of the second registered fingerprint images are matched, the verification of the query fingerprint image may be finally determined to be unsuccessful.

Figure 5:
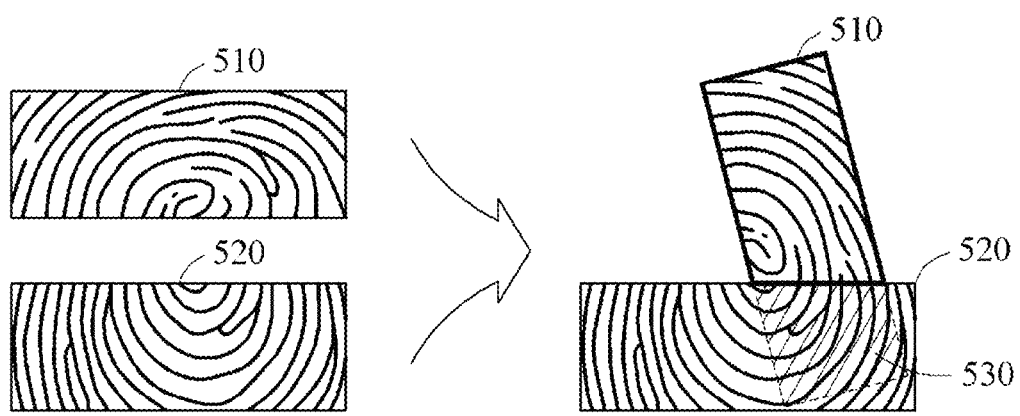
FIG. 5 is a diagram illustrating an example of a first alignment between a query fingerprint image and a first registered fingerprint image according to an example embodiment.

FIG. 5 is a diagram illustrating an example of a first alignment between a query fingerprint image and a first registered fingerprint image according to an example embodiment.

Referring to FIG. 5, a fingerprint verification apparatus estimates rotation information and translation information of a query fingerprint image 510 and a first registered fingerprint image 520, and determines a first matching region 530 between the query fingerprint image 510 and the first registered fingerprint image 520 using the estimated rotation information and the estimated translation information. In an example, for image registration or alignment performed between the query fingerprint image 510 and the first registered fingerprint image 520, a method of aligning patterns or features of a pixel intensity of images in a space, or a method of discovering a parameter needed for the registration or alignment between two images in a frequency domain of the images may be used.

Figure 6:
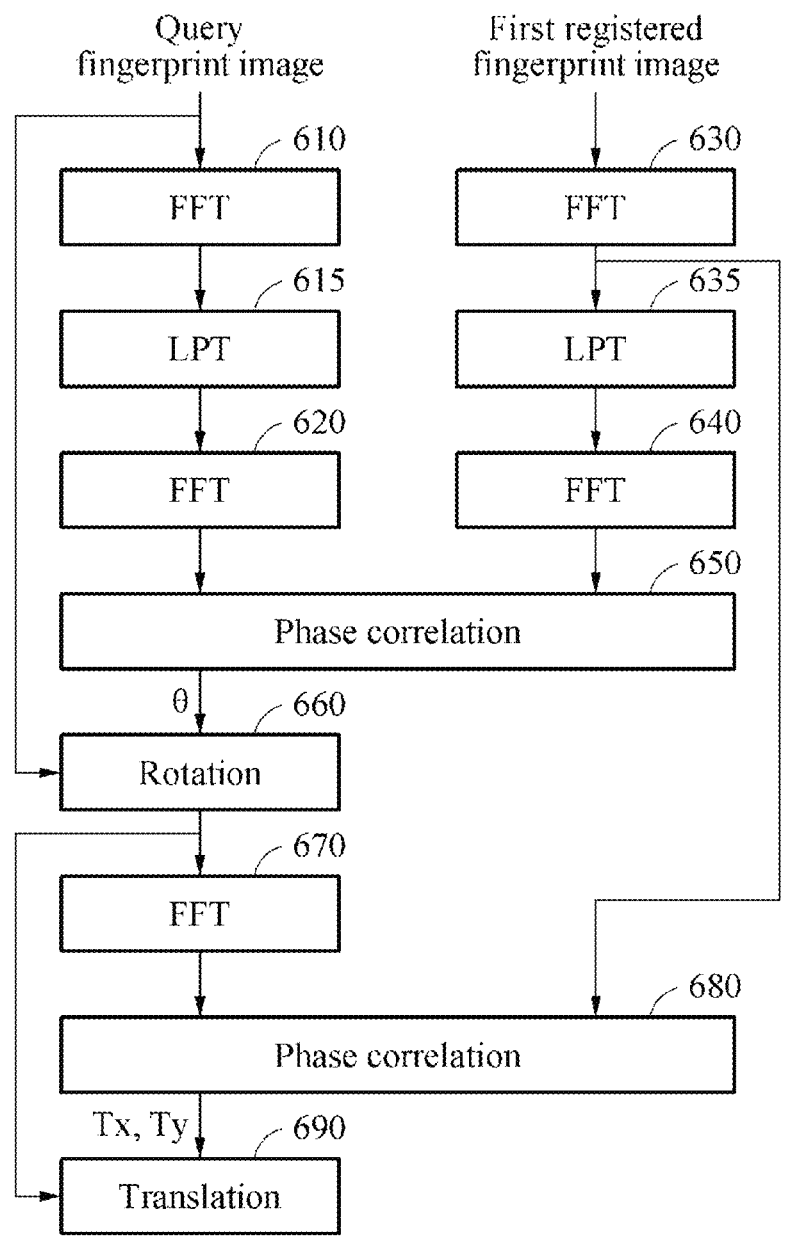
FIG. 6 is a flowchart illustrating an example of determining a similarity between a query fingerprint image and a first registered fingerprint image based on a Fourier-Mellin transform according to an example embodiment.

FIG. 6 is a flowchart illustrating an example of determining a similarity between a query fingerprint image and a first registered fingerprint image based on a Fourier-Mellin transform according to an example embodiment.

Referring to FIG. 6, in operation 610, a fingerprint verification apparatus transforms spatial domain information included in a query fingerprint image into frequency domain information through a fast Fourier transform (FFT). In operation 630, the fingerprint verification apparatus transforms spatial domain information included in a first registered fingerprint image into frequency domain information through an FFT. Herein, frequency domain information may be based on an orthogonal coordinate system representing information using, for example, two-dimensional (2D) (x, y) coordinates.

In operation 615, the fingerprint verification apparatus transforms a coordinate system of the frequency domain information included in the query fingerprint image into a polar coordinate system through a log-polar transform (LPT). For example, an LPT may be performed on a magnitude value of pixels in an FFT image obtained through an FFT. In the polar coordinate system, information may be represented by a radius, an angle, or a combination of the radius and the angle. In operation 635, the fingerprint verification apparatus applies an LPT to the frequency domain information included in the first registered fingerprint image. Hereinafter, the LPT will be described in detail with reference to FIG. 7.

Figure 7:
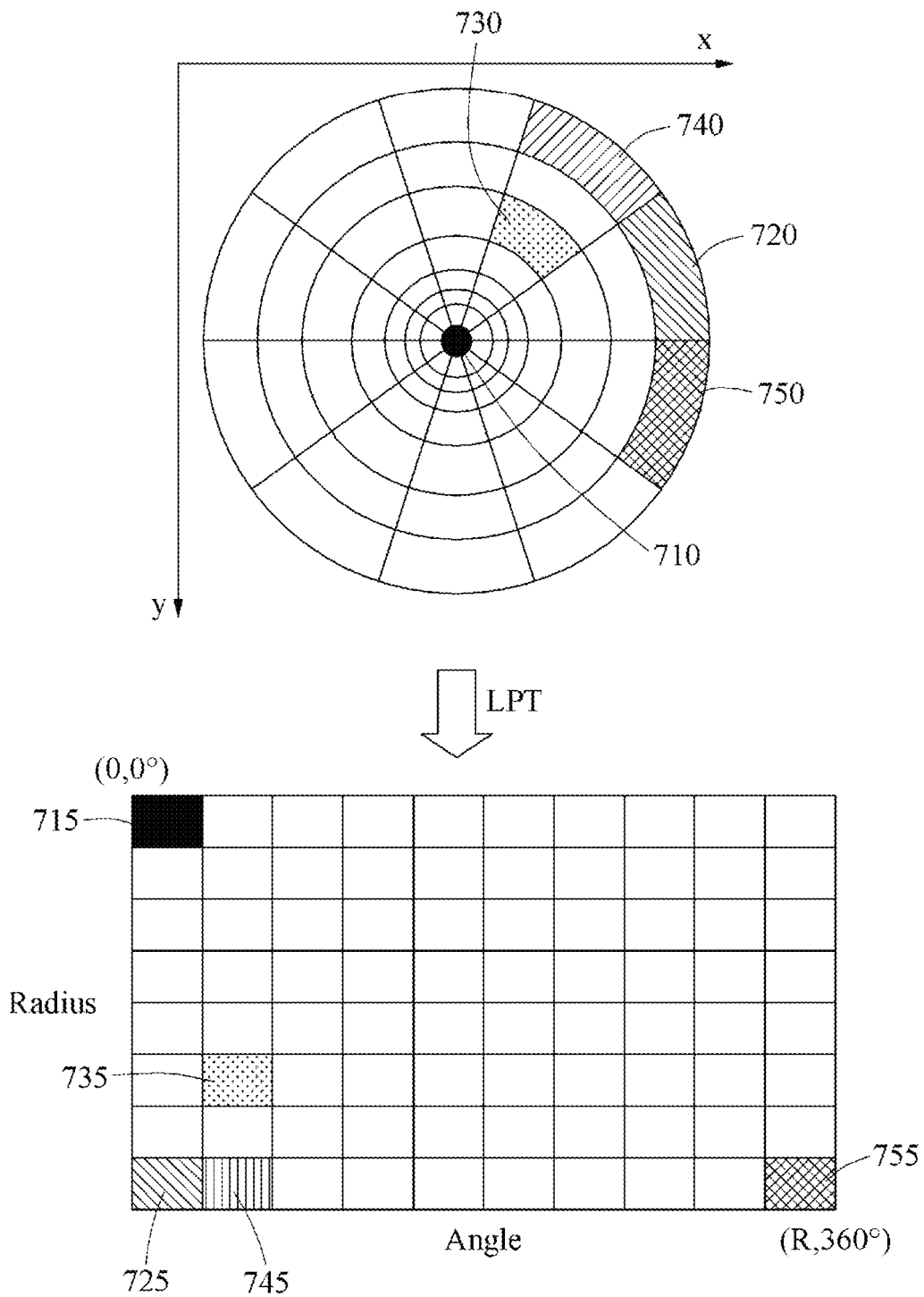
FIG. 7 is a diagram illustrating an example of a log-polar transform (LPT) according to an example embodiment.

FIG. 7 is a diagram illustrating an example of an LPT according to an example embodiment.

Referring to FIG. 7, concentric circles are set based on a center point 710 in an orthogonal coordinate system. The concentric circles are divided into a plurality of regions based on a radius, an angle, or a combination of the radius and the angle. For example, an LPT maps the regions in the orthogonal coordinate system to a plurality of regions of coordinates (radius, angle) in a polar coordinate system. In this example, the center point 710 in the orthogonal coordinate system is mapped to a region 715 corresponding to (0, 0°) in the polar coordinate system. Similarly, a first region 720, a second region 730, a third region 740, and a fourth region 750 in the orthogonal coordinate system are mapped to a fifth region 725, a sixth region 735, a seventh region 745, and an eighth region 755, respectively, in the polar coordinate system.

For another example, the LPT may map regions in the orthogonal coordinate system to regions in the polar coordinate system that are represented based on an angle. In this example, the first region 720 in the orthogonal coordinate system may be mapped to a (0°) region in the polar coordinate system. In addition, the second region 730 and the third region 740 in the orthogonal coordinate system may be mapped to a (36°) region in the polar coordinate system, and the fourth region 750 in the orthogonal coordinate system may be mapped to a (324°) region in the polar coordinate system.

Referring back to FIG. 6, in operation 620, the fingerprint verification apparatus applies an FFT to the query fingerprint image to which the LPT is applied. In operation 640, the fingerprint verification apparatus applies an FFT to the first registered fingerprint image to which the LPT is applied. In operation 650, the fingerprint verification apparatus performs a phase correlation based on a result of the FFT, and detects a peak as a result of the phase correlation. In an example, a position of the detected peak may indicate rotation information θ between the query fingerprint image and the first registered fingerprint image.

In another example, a position of the detected peak may indicate scale information between the query fingerprint image and a partial fingerprint image. For example, one axis of an LPT image obtained through an LPT may correspond to an angle and the other axis of the LPT image may correspond to a radius, and a position of the detected peak through the phase correlation may be indicated by a coordinate on the axis corresponding to an angle, a coordinate on the axis corresponding to an radius. The coordinate on the axis corresponding to an angle may indicate rotation information, and the coordinate on the axis corresponding to a radius may indicate scale information.

In general, a fingerprint image does not change in scale, and thus a radius may be set as a preset value, for example, 1. In this case, a position of the detected peak through the phase correlation may be represented by the coordinate on the axis corresponding to an angle, and the coordinate on the axis corresponding to an angle may indicate rotation information.

In an example, the fingerprint verification apparatus detects a peak value by performing the phase correlation as described above, and determines a similarity between the query fingerprint image and the first registered fingerprint image based on the detected peak value. As a region, or an overlapping region, in which a fingerprint pattern of the query fingerprint image and a fingerprint pattern of the first registered fingerprint image are the same or similar to each other increases, or the fingerprint pattern of the query fingerprint image and the fingerprint pattern of the first registered fingerprint image are more similar to each other, the peak value may tend to increase. Based on such a tendency, the fingerprint verification apparatus determines the similarity between the query fingerprint image and the first registered fingerprint image based on the peak value detected through the phase correlation.

In operation 660, the fingerprint verification apparatus rotates the query fingerprint image based on the rotation information θ. In operation 670, the fingerprint verification apparatus applies an FFT to the rotated query fingerprint image. In operation 680, the fingerprint verification apparatus performs a phase correlation based on the query fingerprint image obtained by applying the FFT in operation 670 and the first registered fingerprint image obtained by applying the FFT in operation 630. A peak is detected as a result of performing the phase correlation, and a position of the detected peak indicates translation information (Tx, Ty) between the query fingerprint image and the first registered fingerprint image. In operation 690, the fingerprint verification apparatus translates the query fingerprint image rotated in operation 660 based on the translation information (Tx, Ty).

The fingerprint verification apparatus performs image registration or alignment between the query fingerprint image and the first registered fingerprint image by rotating and translating the query fingerprint image based on rotation information and translation information obtained through the Fourier-Mellin transform method described above. The fingerprint verification apparatus determines a similarity based on a first matching region determined through the alignment between the rotated and translated query fingerprint image and the first registered fingerprint image. The fingerprint verification apparatus may determine the similarity through various methods. For example, the fingerprint verification apparatus may determine the similarity based on an image brightness-based normalized cross-correlation. For example, the fingerprint verification apparatus may determine the similarity based on a correlation derived through Equation 1.

$$ncc(I_1, I_2) = \frac{\sum_{(i,j) \in W} I_1(i,j) \cdot I_2(x+i, y+j)}{\sqrt[2]{\sum_{(i,j) \in W} I_1^2(i,j) \cdot \sum_{(i,j) \in W} I_2^2(x+i, y+j)}} \quad \text{[Equation 1]}$$

In Equation 1, W denotes a matching region between an image $I_1$ and an image $I_2$, and $ncc(I_1, I_2)$ denotes a correlation in the matching region W between the image $I_1$ and the image $I_2$. The image $I_1$ may be the rotated and translated query fingerprint image, and the image $I_2$ may be the first registered fingerprint image. i denotes an X-axis coordinate of a pixel in the matching region W, and j denotes a Y-axis coordinate of the pixel in the matching region W. x denotes translation information (Tx) in an X-axis direction, and y denotes translation information (Ty) in a Y-axis direction. $I_1(i, j)$ denotes a pixel value on (i, j) coordinates of the image $I_1$, and $I_2(x+i, y+j)$ denotes a pixel value on $(x+i, y+j)$ coordinates of the image $I_2$. The correlation in the matching region W, which is calculated through Equation 1, may be used as the similarity between the query fingerprint image and the first registered fingerprint image.

The foregoing method of calculating the similarity corresponding to the first matching region may be similarly applied to a second matching region.

Although it is illustrated in the example of FIG. 6 that the query fingerprint image is rotated and translated, the first registered fingerprint image may be rotated and translated based on a result of the phase correlation, with the query fingerprint image not being changed. Alternatively, both the query fingerprint image and the first registered fingerprint image may be rotated and translated.

Figure 8:
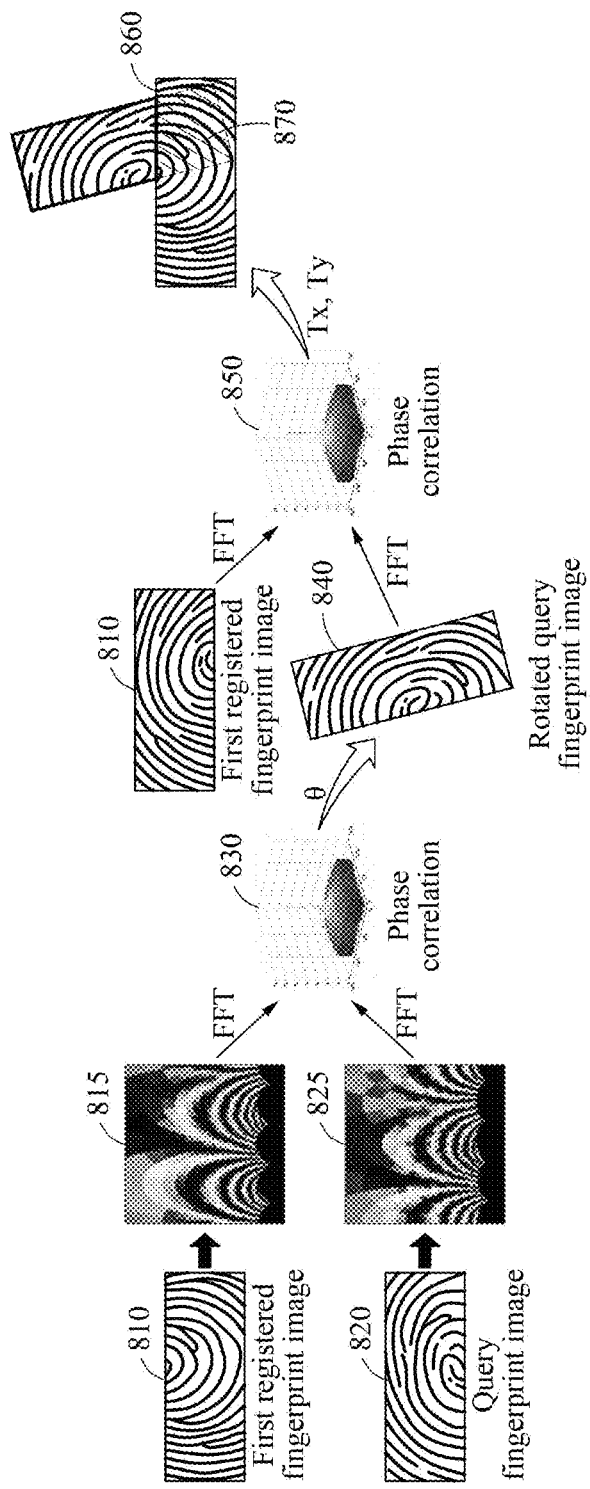
FIG. 8 is a diagram illustrating an example of determining a similarity between a query fingerprint image and a first registered fingerprint image based on a Fourier-Mellin transform according to an example embodiment.

FIG. 8 is a diagram illustrating an example of determining a similarity between a query fingerprint image and a first registered fingerprint image based on a Fourier-Mellin transform according to an example embodiment.

Referring to FIG. 8, a first registered fingerprint image 810 is transformed into a first LPT image 815 through an FFT and an LPT. A query fingerprint image 820 is transformed into a second LPT image 825 through an FFT and an LPT.

Through a phase correlation 830 between the first LPT image 815 and the second LPT image 825, rotation information θ between the first registered fingerprint image 810 and the query fingerprint image 820 is determined. In an example, a similarity between the first registered fingerprint image 810 and the query fingerprint image 820 is determined based on a peak value detected through the phase correlation 830.

The query fingerprint image 820 is rotated based on the rotation information θ determined by the phase correlation 830. Through a phase correlation 850 between an FFT image which is a result image obtained by performing an FFT on the first registered fingerprint image 810 and an FFT image which is a result image obtained by performing an FFT on a rotated query fingerprint image 840, translation information (Tx, Ty) between the first registered fingerprint image 810 and the query fingerprint image 820 is determined.

The first registered fingerprint image 810 and the query fingerprint image 820 are aligned based on the rotation information θ and the translation information (Tx, Ty), and a first matching region 870 between the first registered fingerprint image 810 and the query fingerprint image 820 is determined. In an example, a correlation with respect to the first matching region 870 between the first registered fingerprint image 810 and the query fingerprint image 820 in an aligned image 860 is calculated based on Equation 1, and the calculated correlation is determined to be a similarity between the first registered fingerprint image 810 and the query fingerprint image 820.

In a matching region-based similarity, the similarity based on the peak value detected through the phase correlation 830 or on the correlation calculated through Equation 1 may be assigned to the first matching region 870.

Figures 9A, 9B:
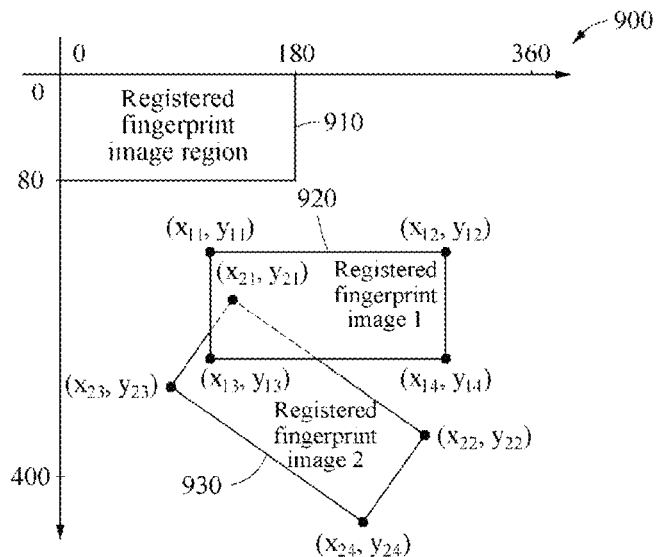
FIGS. 9A and 9B are diagrams illustrating an example of registering a fingerprint image according to an example embodiment.

FIGS. 9A and 9B are diagrams illustrating an example of registering a registered fingerprint image according to an example embodiment.

Referring to FIG. 9A, a fingerprint verification apparatus stores information associated with a registered fingerprint image in a registered fingerprint image DB. The fingerprint verification apparatus registers preregistered (hereinafter simply "registered") fingerprint images in two different regions included in a coordinate system 900. The fingerprint verification apparatus registers the registered fingerprint images in a registered fingerprint image region 910 and a global region 950.

The registered fingerprint image region 910 is set in the coordinate system 900 to register a registered fingerprint image. The registered fingerprint image region 910 is a set or fixed region that is used independently for each of all registered fingerprint images. The fingerprint verification apparatus registers all of the registered fingerprint images at set positions in the registered fingerprint image region 910.

The global region 950 is a region in which a registered fingerprint image is to be registered based on a matching relationship between the registered fingerprint images. The fingerprint verification apparatus determines positions of registered fingerprint images 920 and 930 in the global region 950 based on the matching relationship, and registers the registered fingerprint images 920 and 930 in the global region 950 based on the determined positions.

In a fingerprint image registration process, the fingerprint verification apparatus performs matching between a fingerprint image to be newly registered and a previously registered fingerprint image, and determines a positional relationship between the fingerprint images in the global region 950 based on a result of the matching. For example, both the registered fingerprint image 920 and the registered fingerprint image 930 have an overlapping region 951. In the illustrated example, the registered fingerprint images 920 and 930 have an overlapping region 951 therebetween. The fingerprint verification apparatus determines respective positions of the registered fingerprint images 920 and 930 in the global region 950 based on a matching relationship between the registered fingerprint images 920 and 930 that is determined based on the region 951. That is, the fingerprint verification apparatus registers, in the global region 950, the registered fingerprint images 920 and 930 with the region 951, which is an overlapping region between the registered fingerprint image 920 and 930, based on the matching relationship between the registered fingerprint images 920 and 930.

Referring to FIG. 9B, a table 940 illustrates an example of data to be stored in a registered fingerprint image DB through the fingerprint image registration method described above with reference to FIG. 9A. As illustrated in the table 940, the registered fingerprint image DB stores therein a registered fingerprint image region coordinate in a coordinate system, a global region coordinate in the coordinate system, and a transform parameter, for each registered fingerprint image.

The transform parameter includes a rotational transformation parameter (sin θ, cos θ) and a parallel translation parameter (Tx, Ty) for a transformation from the registered fingerprint image region 910 to the respective positions of the registered fingerprint images 920 and 930 in the global region 950.

Such a coordinate transformation through the transform parameter may correspond to a rigid transformation with only a rotational and translational transformation, without a change in scale.

The rigid transformation may be performed based on Equations 2 and 3.

$$\begin{pmatrix} X' \\ Y' \end{pmatrix} = \begin{pmatrix} A & -B \\ B & A \end{pmatrix} \begin{pmatrix} X \\ Y \end{pmatrix} + \begin{pmatrix} C \\ D \end{pmatrix} \quad \text{[Equation 2]}$$

-continued $$AX - BY + C = X'$$
$$BX - AY + D = Y'$$
[Equation 3]

In Equations 2 and 3, X and Y denote coordinates before the rigid transformation, and X' and Y' denote coordinates after the rigid transformation. A and B denote rotational transformation parameters corresponding to cos θ and sin θ, respectively. C and D denote parallel translation parameters corresponding to Tx and Ty, respectively.

In Equation 3, there are four unknowns parameters, A, B, C, and D, and thus respective parameters may be determined by applying, to Equation 3, two different points corresponding to before the transformation and after the transformation.

For example, as illustrated, a transform parameter of the registered fingerprint image 920 is determined by applying, to Equation 3, coordinates (0, 0) and (180, 0) in the registered fingerprint image region 910, and corresponding coordinates (x11, y11) and (x12, y12).

Figure 10A:
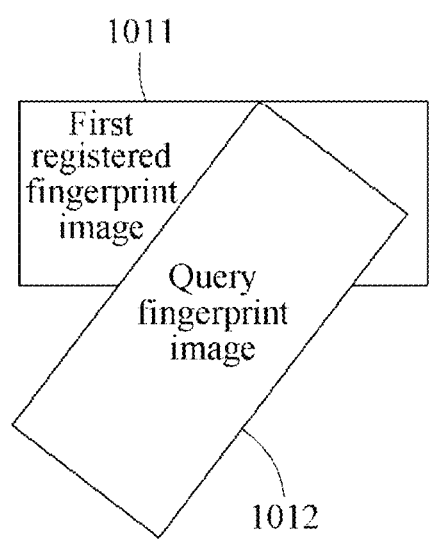
FIGS. 10A through 10C are diagrams illustrating an example of second matching performed by a fingerprint verification apparatus according to an example embodiment.
Figure 10B:
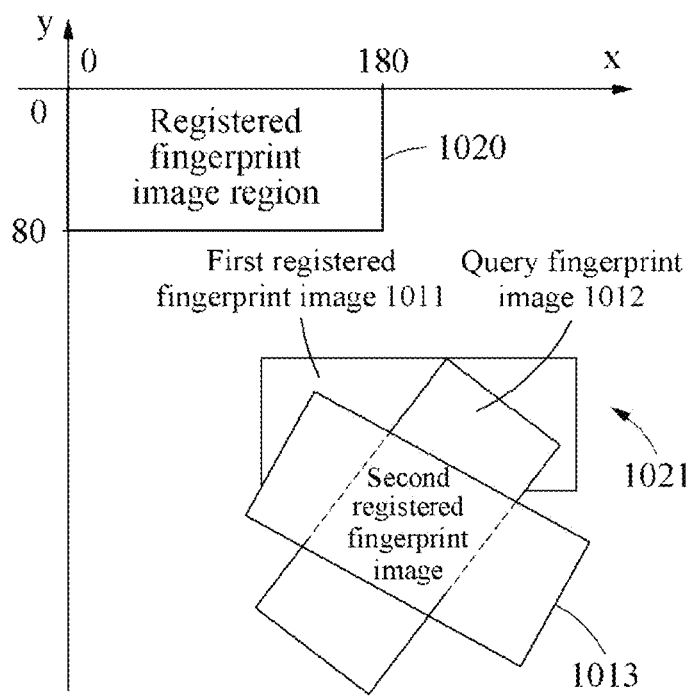
Figure 10C:
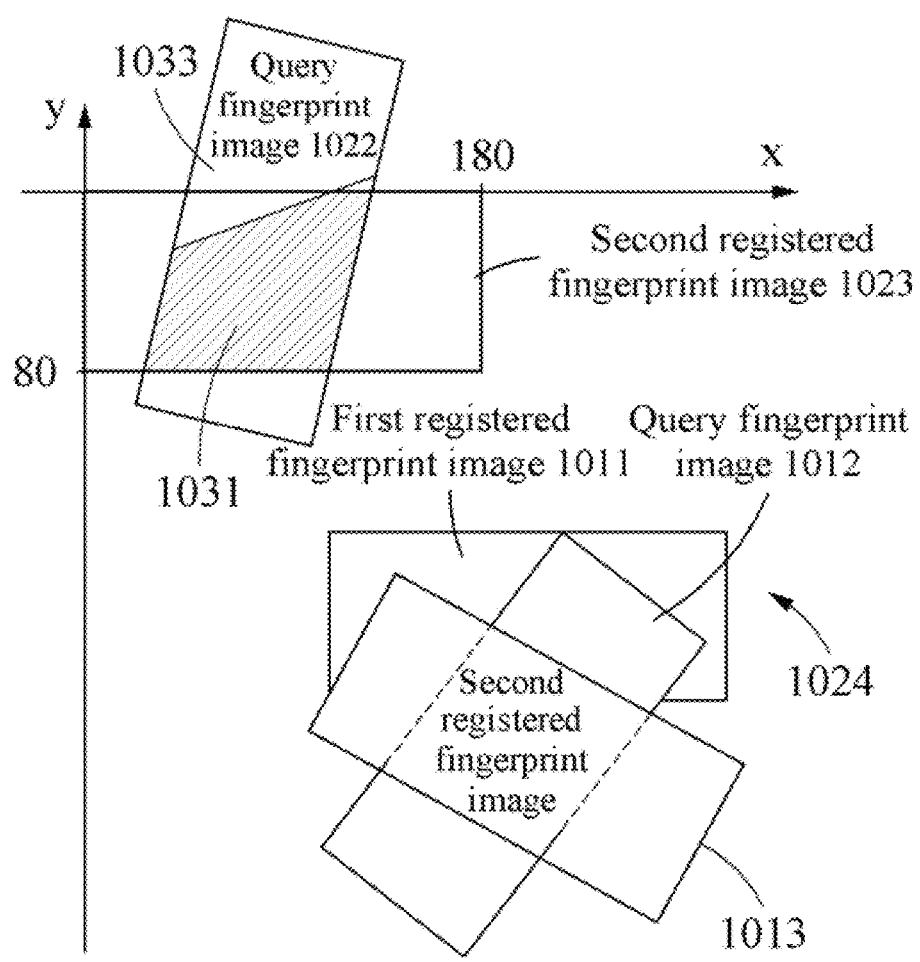

FIGS. 10A through 10C are diagrams illustrating an example of second matching performed by a fingerprint verification apparatus according to an example embodiment.

A coordinate system region illustrated in FIG. 10A is a region in a coordinate system that is different from coordinate system regions illustrated in FIGS. 10B and 10C to perform first matching. The coordinate system regions illustrated in FIGS. 10B and 10C are the same coordinate system regions, and include registered fingerprint image regions 1020 and 1023 and global regions 1021 and 1024, respectively.

FIG. 10A illustrates a positional relationship between a query fingerprint image 1012 and a first registered fingerprint image 1011 on which first matching is performed. FIG. 10B illustrates an example of determining a second registered fingerprint image 1013. FIG. 10C illustrates an example of determining a second matching region through a second alignment.

Referring to FIG. 10A, the query fingerprint image 1012 and the first registered fingerprint image 1011 are aligned through a first alignment based on the first matching. A first matching region, or an overlapping region, between the query fingerprint image 1012 and the first registered fingerprint image 1022 is determined through the first matching, and a similarity corresponding to the first matching region is determined. When a first matching result of the first matching does not satisfy a preset verification condition, verification of the query fingerprint image 1012 is not completed. In such a case, second matching is additionally required. A fingerprint verification apparatus determines the second registered fingerprint image 1013 to perform the second matching. The second matching is performed on a region which is not the first matching region that matches the first registered fingerprint image 1011 among regions of the query fingerprint image 1012. The second registered fingerprint image 1013 is a registered fingerprint image having a region overlapping the query fingerprint image 1011, excluding the first matching region, among the regions of the query fingerprint image 1012.

In an example, the second registered fingerprint image 1013 is determined based on a result of the first alignment and a positional relationship between the registered fingerprint images 1011 and 1013. For example, as illustrated in FIG. 10A, a positional relationship between the query fingerprint image 1012 and the first registered fingerprint image 1011 is determined based on the first alignment. The fingerprint verification apparatus determines a first transform parameter to transform a position of the first registered fingerprint image 1011 in the coordinate system region illustrated in FIG. 10A into a position thereof in the global coordinate system region 1021 illustrated in FIG. 10B, based on Equation 3. For example, the fingerprint verification apparatus determines the first transform parameter for the first registered fingerprint image 1011 by applying, to Equation 3, vertex coordinates of the first registered fingerprint image 1011 in the coordinate system region illustrated in FIG. 10A and corresponding vertex coordinates of the first registered fingerprint image 1011 illustrated in FIG. 10B. Through the determined first transform parameter, the position of the first registered fingerprint image 1011 in the coordinate system region illustrated in FIG. 10A is transformed into the position of the first registered fingerprint image 1011 in the global coordinate system region 1021 illustrated in FIG. 10B.

The fingerprint verification apparatus determines a position of the query fingerprint image 1012 in the global coordinate system region 1021 based on the determined first transform parameter. The fingerprint verification apparatus determines the position of the query fingerprint image 1012 in the global coordinate system region 1021 illustrated in FIG. 10B by transforming the position of the query fingerprint image 1012 in the coordinate system region illustrated in FIG. 10A based on the first transform parameter. Since the positional relationship between the query fingerprint image 1012 and the first registered fingerprint image 1011 that is determined through the first alignment performed in the first matching is maintained despite a change in coordinate system, the fingerprint verification apparatus determines the position of the query fingerprint image 1012 in the global coordinate system region 1021 illustrated in FIG. 10B by applying the first transform parameter to the query fingerprint image 1012 in the coordinate system region illustrated in FIG. 10A. Such positional transformation of the query fingerprint image 1012 through the first transform parameter is performed based on Equation 4.

$$I_G = R_G I_L + T_G$$
[Equation 4]

In Equation 4, $I_L$ denotes a position of a query fingerprint image in a coordinate system region as illustrated in FIG. 10A. $R_G$ and $T_G$ denote a rotational transformation parameter and a parallel translation parameter, respectively, of the first transform parameter. $I_G$ denotes a position of the query fingerprint image in a global coordinate system region.

The fingerprint verification apparatus determines the second registered fingerprint image 1013 based on the position of the query fingerprint image 1012 in the global coordinate system region illustrated in FIG. 10B. The fingerprint verification apparatus determines the second registered fingerprint image 1013 matching the query fingerprint image 1012 based on the position of the query fingerprint image 1012 in the coordinate system region illustrated in FIG. 10B. For example, a registered fingerprint image overlapping a region of the query fingerprint image 1012 that does not match the first registered fingerprint image 1011 among the regions of the query fingerprint image 1012 is determined to be the second registered fingerprint image 1013.

Although a single second registered fingerprint image, for example, the second registered fingerprint image 1013, is illustrated, a plurality of second registered fingerprint images may be determined when there is a plurality of registered fingerprint images overlapping a query fingerprint image.

When the second registered fingerprint image 1013 is determined, the fingerprint verification apparatus performs the second matching between the query fingerprint image 1012 and the second registered fingerprint image 1013.

How the fingerprint verification apparatus performs the second matching will be described hereinafter by referring to a coordinate system region illustrated in FIG. 10C.

The fingerprint verification apparatus performs a second alignment to determine a second matching region between the query fingerprint image 1012 and the second registered fingerprint image 1013 that are present in the global coordinate system region 1024 illustrated in FIG. 10C.

As described above with reference to FIG. 9, all registered fingerprint images are stored in the registered fingerprint image region 1023 and the global coordinate system region 1024. In addition, a second transform parameter that transforms a position of each registered fingerprint image in the registered fingerprint image region 1023, which is a set region, into a position of each registered fingerprint image in the global coordinate system region 1024 is determined in advance for each of the registered fingerprint images, for example, the registered fingerprint images 1011 and 1013, in a fingerprint image registration process, and is then stored in a registered fingerprint image DB.

The fingerprint verification apparatus translates a position of the query fingerprint image 1012 in the global coordinate system region 1024 to a position 1022 based on the second transform parameter predetermined for the second registered fingerprint image 1013. The position 1022 is a position of the query fingerprint image 1012 in a coordinate system for the second registered fingerprint image 1013 registered in the registered fingerprint image region 1023. Since a positional relationship between the query fingerprint image 1012 and the second registered fingerprint image 1013 is maintained despite a positional transformation, the query fingerprint image 1012 present in the global coordinate system region 1024 is translated to the position 1022 based on the second transform parameter. The positional transformation based on the second transform parameter may be performed based on Equation 5.

$$I_C = R_i^{-1} I_G - T_i$$ [Equation 5]

In Equation 5, $I_C$ denotes a position, for example, the position 1022, of a query fingerprint image in a coordinate system for a registered fingerprint image, and $I_G$ denotes a position of the query fingerprint image in the global coordinate region 1024. $R_i$ denotes a rotational transformation parameter of the second transform parameter for an ith second registered fingerprint image, and $T_i$ denotes a parallel translation parameter of the second transform parameter for the ith second registered fingerprint image.

For example, as represented by Equation 5 above, when there is a plurality of second registered fingerprint images, the second alignment may be performed on each of the second registered fingerprint images. In this example, the second alignment may be performed in an order starting with a second registered fingerprint image having a largest region matching a query fingerprint image.

The fingerprint verification apparatus determines a second matching region 1031 using the query fingerprint image 1012 whose position is translated into the position 1022 through the second alignment and a second registered fingerprint image registered in the registered fingerprint image region 1023, and determines a similarity corresponding to the second matching region 1031. The similarity corresponding to the second matching region 1031 may be calculated in a manner similar to determining a similarity corresponding to a first matching region 1033. The second matching region 1031 may indicate a region in which the query fingerprint image and the second registered image are matched, excluding the first matching region 1033.

The fingerprint verification apparatus calculates a score based on a result of the first matching and a result of the second matching, and determines a fingerprint verification result based on the calculated score.

Figure 11:
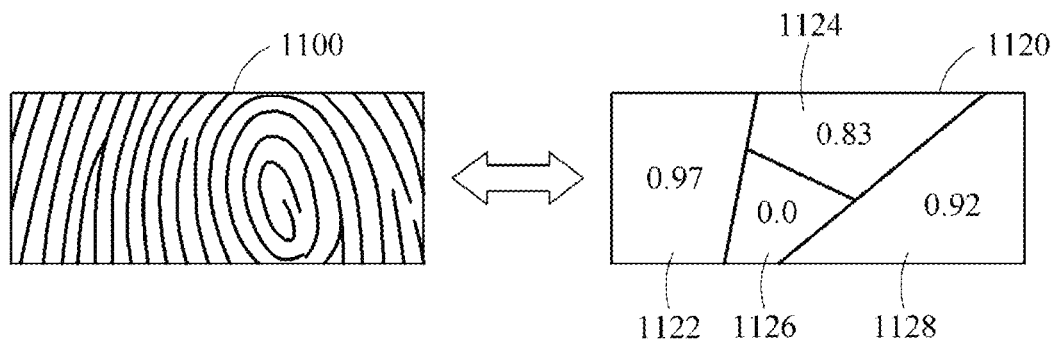
FIG. 11 is a diagram illustrating an example of determining a fingerprint verification result based on a matching region-based similarity according to an example embodiment.

FIG. 11 is a diagram illustrating an example of determining a fingerprint verification result based on a matching region-based similarity.

Referring to FIG. 11, a matching region-based similarity 1120 is visually embodied by an image with a same resolution as a query fingerprint image 1100. For example, when the query fingerprint image 1100 has a resolution of n (number of pixels in a horizontal direction)×m (number of pixels in a vertical direction), a resolution of the matching region-based similarity 1120 is also n×m. A similarity for each matching region included in the matching region-based similarity 1120 may correspond to a similarity determined between the query fingerprint image 1100 and each registered fingerprint image.

In the matching region-based similarity 1120, a first matching region 1128 is a region determined based on first matching with a first registered fingerprint image, and a similarity of 0.92 is assigned to the first matching region 1128. In addition, similarities of 0.97, 0.83, and 0.0 are assigned to second matching regions 1122, 1124, and 1126, respectively. The similarity 0.0 assigned to the second matching region 1126 may indicate that there is no matching region with any one of registered fingerprint images, or a similarity between the query fingerprint image 1100 and a matched second registered fingerprint image is considerably low.

A fingerprint verification apparatus assigns a score to the query fingerprint image 1100 based on a size of each matching region and a similarity assigned to each matching region. When the score assigned to the entire query fingerprint image 1100 is greater than a preset threshold value, the fingerprint verification apparatus determines that fingerprint verification of the query fingerprint image 1100 is successful. The greater the similarity for each matching region, the greater the score to be assigned.

Figure 12:
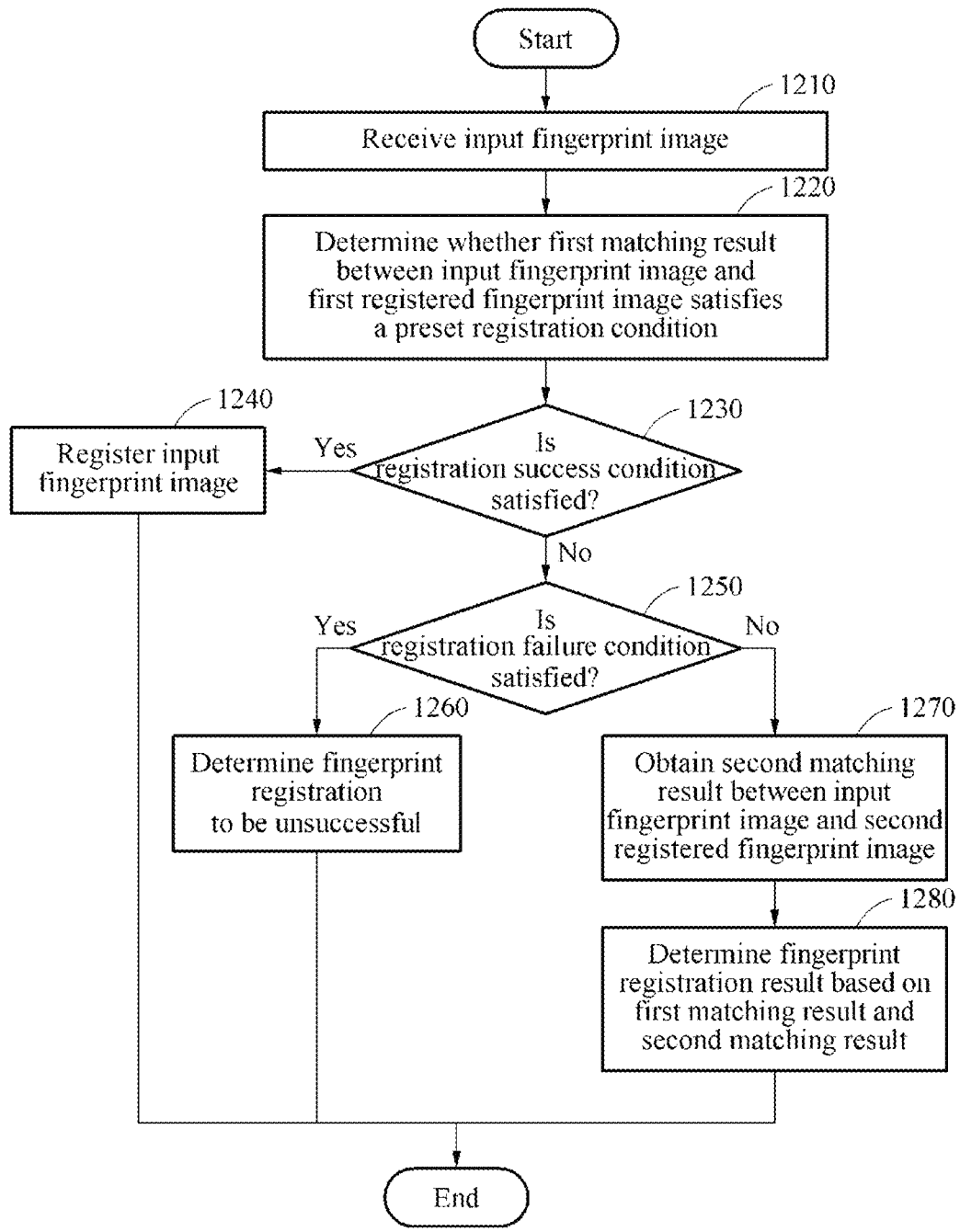
FIG. 12 is a flowchart illustrating an example of a fingerprint registration method according to an example embodiment.

FIG. 12 is a flowchart illustrating an example of a fingerprint registration method according to an example embodiment.

Referring to FIG. 12, in operation 1210, a fingerprint verification apparatus receives an input fingerprint image. The fingerprint verification apparatus may receive the input fingerprint image through an embedded sensor.

In operation 1220, the fingerprint verification apparatus determines whether a first matching result of matching between the input fingerprint image and a first registered fingerprint image satisfies a preset registration success condition. The fingerprint verification apparatus determines, to be the first registered fingerprint image, a registered fingerprint image having a largest region overlapping the input fingerprint image among fingerprint images registered in advance.

The fingerprint verification apparatus determines at least one of translation information or rotation information from the input fingerprint image and the first registered fingerprint image based on a frequency information-based matching method, and performs a first alignment between the input fingerprint image and the first registered fingerprint image based on the determined information.

The fingerprint verification apparatus determines a first matching region between the input fingerprint image and the first registered fingerprint image based on a result of the first alignment. The fingerprint verification apparatus obtains the first matching result by calculating a similarity corresponding to the first matching region. The fingerprint verification apparatus calculates a score based on a size of the first matching region and the similarity corresponding to the first matching region that are determined based on the first matching result, and determines whether the calculated score satisfies the registration condition. The registration condition may be used to verify an overlapping region between the input fingerprint image and a registered fingerprint image, and determined based on a result of comparing the score calculated for the first matching region and a preset threshold value. The first alignment and the similarity calculation may be performed in a manner similar to those described above with reference to FIGS. 5 through 8. Here, the registration condition may include a registration success condition and a registration failure condition.

In operation 1230, the fingerprint verification apparatus determines whether the registration condition is satisfied. In operation 1240, when the registration success condition is determined to be satisfied in operation 1230, the fingerprint verification apparatus registers the input fingerprint image in a registered fingerprint image DB.

In operation 1250, when the registration success condition is determined not to be satisfied in operation 1230, the fingerprint verification apparatus determines whether the registration failure condition is satisfied. For example, the registration failure condition may indicate that the similarity between the input fingerprint image and the first registered fingerprint image is low and the calculated score is less than the preset threshold value, or that the input fingerprint image is determined to be a fingerprint image overlapping the first registered fingerprint image. In operation 1260, when the registration failure condition is determined to be satisfied in operation 1250, the fingerprint verification apparatus determines that fingerprint registration is unsuccessful.

In operation 1270, when the registration failure condition is determined not to be satisfied, the fingerprint verification apparatus obtains a second matching result of matching between the input fingerprint image and a second registered fingerprint image. The second fingerprint image may be an image having a region overlapping the input fingerprint image that is different from the first matching region among regions of the input fingerprint image. Herein, the matching between the input fingerprint image and the second registered fingerprint image is referred to as second matching, and is performed on a region on which the first matching is not performed. The second matching may be performed in a same way as described above with reference to FIG. 10.

In operation 1280, the fingerprint verification apparatus determines a fingerprint registration result based on the first matching result and the second matching result. The fingerprint verification apparatus obtains information associated with the first matching region and the similarity corresponding to the first matching region based on the first matching result. In addition, the fingerprint verification apparatus obtains information associated with a second matching region and a similarity corresponding to the second matching region based on the second matching result. The fingerprint verification apparatus determines a score based on a size of each matching region and a matching region-based similarity, and determines the fingerprint registration result based on the determined score. The fingerprint registration may be performed to register a newly input fingerprint image, and a threshold value may be set such that all regions of a fingerprint of a user are registered. For example, compared to a verification condition for fingerprint verification, the registration condition may be set such that a fingerprint image having a matching region of a relatively smaller size is registered. Thus, through this registration, all of the regions of the fingerprint of the user may be registered.

As described above with reference to FIG. 9, the fingerprint verification apparatus may register a registered fingerprint image both in a registered fingerprint image region in a coordinate system and a global region in the coordinate system.

Figure 13A:
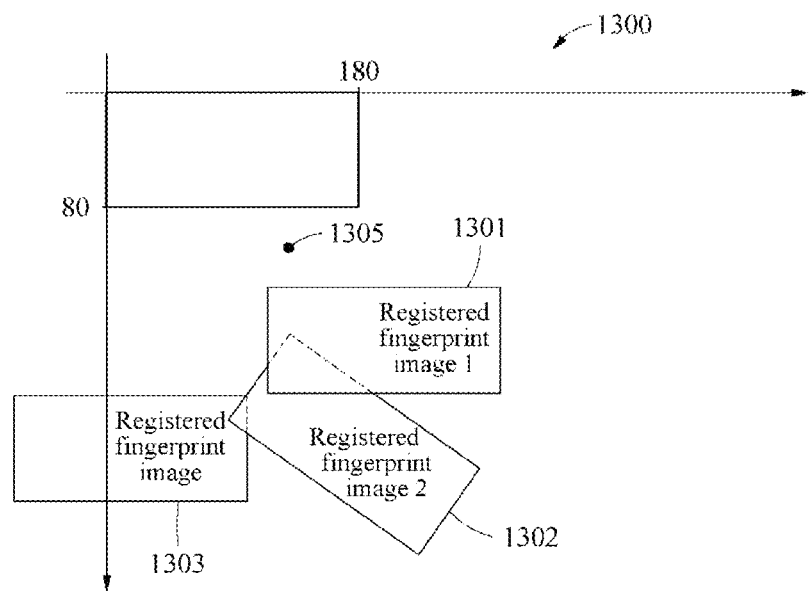
FIGS. 13A and 13B are diagrams illustrating an example of expanding a coordinate system in a process of registering an input fingerprint image according to an example embodiment.
Figure 13B:
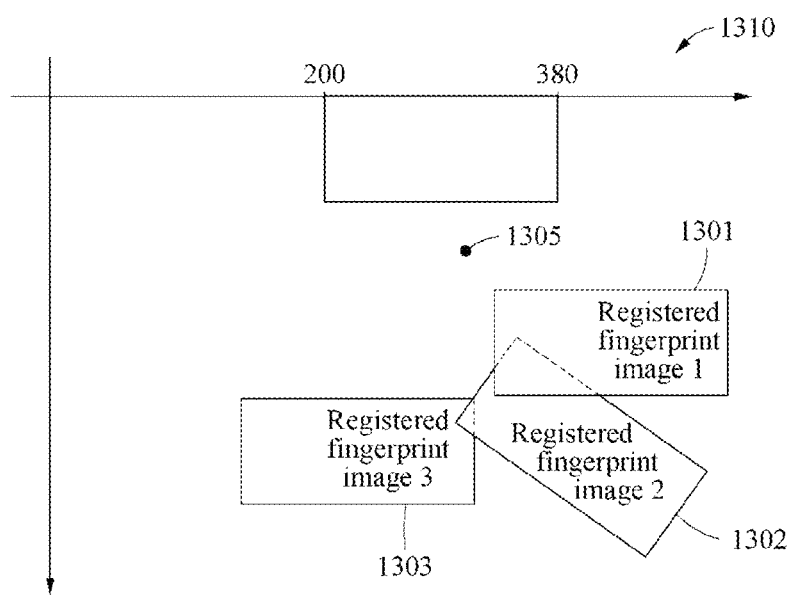

FIGS. 13A and 13B are diagrams illustrating an example of expanding a coordinate system in a process of registering an input fingerprint image according to an example embodiment.

Referring to FIG. 13A, a registered fingerprint image 1301 and a registered fingerprint image 1302 are registered in a global region included in a coordinate system region 1300. Through a process described above with reference to FIG. 12, a registered fingerprint image 1303 is newly registered in the global region in the coordinate system region 1300. The newly registered fingerprint image 1303 deviates from the previously set coordinate system region 1300, and thus the coordinate system region 1300 may need to be expanded. When the coordinate system region 1300 is expanded to a coordinate system region 1310, a position of a center 1305 of the coordinate system region 1300 changes to a position of the center 1305 of the coordinate system region 1310. Thus, by the changed position of the center 1305, respective positions of the registered fingerprint images 1301, 1302, and 1303 also change accordingly, and a positional relationship as illustrated in the coordinate system region 1310 is established. Information associated with a position of a registered fingerprint image may be recalculated and updated based on a position in an expanded coordinate system. That is, information illustrated in the table 940 of FIG. 9B may be recalculated and updated when a corresponding coordinate system is expanded.

Figure 14:
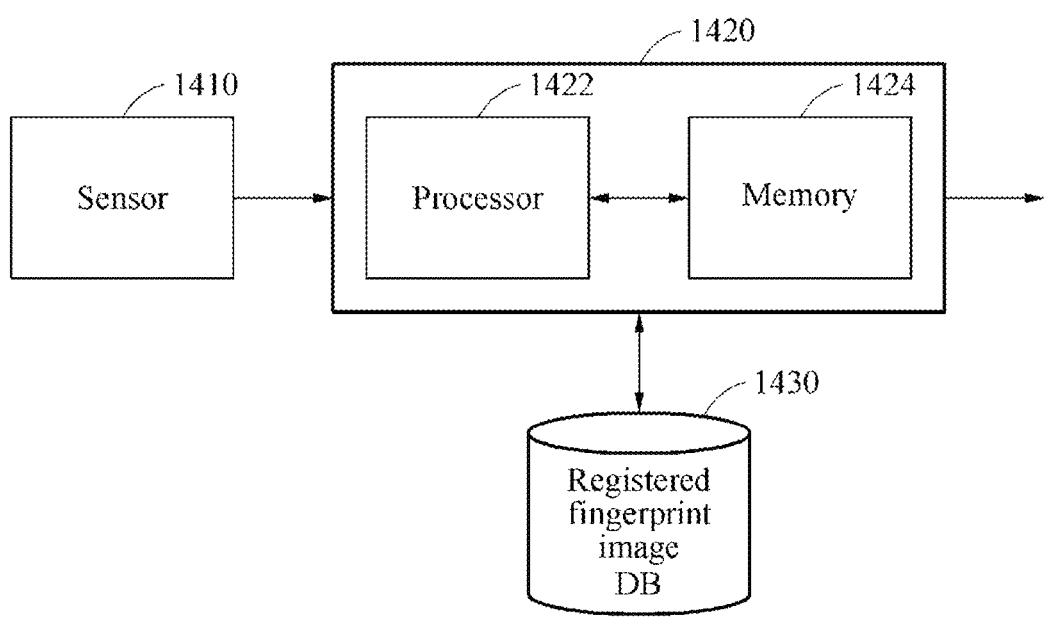
FIG. 14 is a diagram illustrating an example of a fingerprint verification apparatus according to an example embodiment.

FIG. 14 is a diagram illustrating an example of a fingerprint verification apparatus according to an example embodiment.

Referring to FIG. 14, a sensor 1410 may obtain fingerprint information of a user who attempts at fingerprint verification and generate a query fingerprint image. The query fingerprint image may be transmitted to a fingerprint verification apparatus 1420, and the fingerprint verification apparatus 1420 may perform the fingerprint verification by comparing the query fingerprint image and at least one of registered fingerprint images stored in a registered fingerprint image DB 1430.

The fingerprint verification apparatus 1420 includes at least one processor 1422 and a memory 1424. The memory 1424 is a non-transitory computer readable medium or device connected to the processor 1422, and stores instructions, which when executed by the processor 1422, cause the processor 1422 to implement one or more or all operations described herein. The memory 1424 stores data to be processed by the processor 1422 or data having been processed by the processor 1422. The memory 1424 includes, for example, a high-speed random-access memory (RAM) and/or a nonvolatile computer-readable storage medium (e.g., at least one disk storage device, a flash memory device, or other nonvolatile solid-state memory devices).

The processor 1422 may execute instructions to perform one or more or all of the operations described above with reference to FIGS. 1 through 13B.

Figure 15:
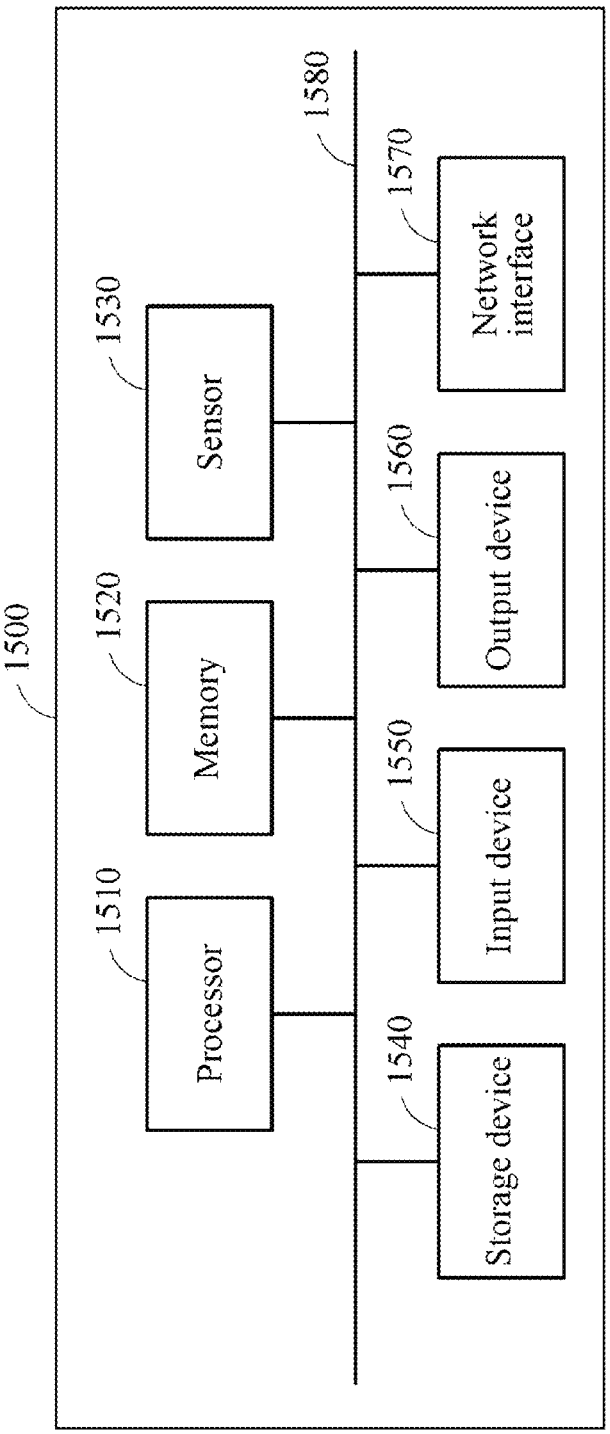
FIG. 15 is a diagram illustrating an example of a computing apparatus according to an example embodiment.

FIG. 15 is a diagram illustrating an example of a computing apparatus according to an example embodiment.

Referring to FIG. 15, a computing apparatus 1500 obtains a fingerprint image of a user, and performs fingerprint verification by comparing the obtained fingerprint image and a registered fingerprint image. The computing apparatus 1500 may include functions of the fingerprint verification apparatus 1420 of FIG. 14. The computing apparatus 1500 includes a processor 1510, a memory 1520, a sensor 1530, a storage device 1540, an input device 1550, an output device 1560, and a network interface 1570. The processor 1510, the memory 1520, the sensor 1530, the storage device 1540, the input device 1550, the output device 1560, and the network interface 1570 may communicate with one another through a communication bus 1580.

The processor 1510 may implement functions and instructions to operate in the computing apparatus 1500 as described herein. For example, the processor 1510 executes instructions stored in the memory 1520 or the storage device 1540. The processor 1510 may perform one or more, any combination, or all operations described with reference to FIGS. 1 through 14.

The memory 1520 may store information to be used for the fingerprint verification. The memory 1520 may include a computer-readable storage medium or device. For example, the memory 1520 may include a RAM, a dynamic RAM (DRAM), a static RAM (SRAM), or other types of nonvolatile memories. The memory 1520 may store instructions to be executed by the processor 1510, and related information while a software or application is being executed by the computing apparatus 1500.

The sensor 1530 may obtain a query fingerprint image in response to a fingerprint input from a user. The fingerprint input may include all types of action or manipulation performed by the user to input a fingerprint of the user. For example, when a finger of the user touches a sensing region of the sensor 1530 or a finger of the user swipes at the sensing region, the sensor 1530 may sense a fingerprint of the finger. In this example, in a case in which the sensor 1530 is integrated in a display, the sensing region may be represented by a surface of the display, and the sensor 1530 may sense a fingerprint from a finger that is in contact with the display. The sensor 1530 may be embodied to perform the foregoing operation through various methods, for example, an ultrasonic method, a mutual capacitance method, and an infrared image capturing method. The sensor 1530 captures, as a fingerprint image, a fingerprint region corresponding to the sensing region.

The storage device 1540 may include a computer-readable storage medium or a computer-readable storage device. The storage device 1540 may store a DB including registered fingerprint images. The storage device 1540 may store a greater amount of information for a longer period of time, compared to the memory 1520. The storage device 1540 may include, for example, a magnetic hard disk, an optical disc, a flash memory, an erasable programmable read-only memory (EPROM), a floppy disk, or other types of nonvolatile memories.

The input device 1550 may receive an input from a user through a tactile, video, audio, or touch input. The output device 1560 may provide the user with an output of the computing apparatus 1500 through a visual, auditory, or tactile channel. For example, the output device 1560 may visualize information related to the fingerprint verification and provide the user with the visualized information.

The network interface 1570 may communicate with an external device through a wired or wireless network. The network interface 1570 may include, for example, an Ethernet card, an optical transceiver, a radio frequency transceiver, and other network interface cards configured to transmit and receive information. The network interface 1570 may wirelessly communicate with the external device using a communication method, such as, for example, Bluetooth, WiFi, or a third generation (3G), fourth generation (4G), or fifth generation (5G) communication method.

According to example embodiments described herein, when a fingerprint verification apparatus receives a query fingerprint image corresponding to a portion of a fingerprint, the fingerprint verification apparatus may perform fingerprint verification with an improved accuracy by matching the query fingerprint image and a registered fingerprint image.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor (e.g., a central processing unit (CPU)), a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processor(s).

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks;

magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While this disclosure includes specific examples, it will be apparent to one of ordinary skill in the art that various changes in form and details may be made in these examples without departing from the spirit and scope of the claims and their equivalents.

What is claimed is:

1. A method of verifying a fingerprint, the method comprising:
    performing a first matching between a fingerprint image and a first registered fingerprint image;
    determining whether a first condition for a verification success is satisfied based on a result of the first matching in which a first score of the first matching is greater than a first threshold value;
    in response to the first condition being not satisfied, determining whether a second condition for a verification fail is satisfied based on the result of the first matching in which the first score of the first matching is less than a second threshold value that is less than the first threshold value;
    in response to the second condition being not satisfied, performing a second matching between the fingerprint image and a second registered fingerprint image, the second registered fingerprint image being different from the first registered fingerprint image; and
    verifying the fingerprint based on the result of the first matching and a result of the second matching,
    wherein the verifying the fingerprint further comprises:
        assigning a second score to the fingerprint image based on a size of each of a first matching region of the first matching and a second matching region of the second matching, and a similarity assigned to each of the first matching region and the second matching region; and
        verifying the fingerprint based on the second score.

2. The method of claim 1, wherein the performing the first matching comprises:
    performing a first alignment between the fingerprint image and the first registered fingerprint image;
    determining the first matching region between the fingerprint image and the first registered fingerprint image based on a result of the first alignment; and
    obtaining the result of the first matching based on at least one of the size of the first matching region and the similarity between the fingerprint image and the first registered fingerprint image corresponding to the first matching region.

3. The method of claim 2, wherein the performing the first alignment comprises:
    determining at least one of translation information and rotation information from the fingerprint image and the first registered fingerprint image based on a frequency information-based matching method; and
    performing the first alignment between the fingerprint image and the first registered fingerprint image based on the at least one of the translation information and the rotation information.

4. The method of claim 2, wherein the second registered fingerprint image is determined to be at least one of registered fingerprint images overlapping a region of the fingerprint image other than the first matching region.

5. The method of claim 4, wherein the second registered fingerprint image is determined based on the result of the first matching and a positional relationship between the registered fingerprint images.

6. The method of claim 1, wherein the performing the second matching comprises:
    performing a second alignment between the fingerprint image and the second registered fingerprint image;
    determining the second matching region between the fingerprint image and the second registered fingerprint image based on a result of the second alignment; and
    obtaining the result of the second matching based on at least one of the size of the second matching region and the similarity between the fingerprint image and the second registered fingerprint image corresponding to the second matching region.

7. The method of claim 6, wherein the performing the second alignment comprises:
    determining a position of the fingerprint image in a coordinate system for the second registered fingerprint image; and
    performing the second alignment between the fingerprint image and the second registered fingerprint image based on the determined position of the fingerprint image.

8. The method of claim 7, wherein the determining the second matching region comprises:
    determining the second matching region based on the determined position of the fingerprint image and a position of the second registered fingerprint image in the coordinate system.

9. The method of claim 7, wherein the position of the fingerprint image is determined based on a transform parameter predetermined for the second registered fingerprint image.

10. The method of claim 6, wherein the performing the second alignment comprises:
    in response to a plurality of second registered fingerprint images being present, performing the second alignment on a second registered fingerprint image having a largest region overlapping the fingerprint image, and sequentially performing the second alignment on a second registered fingerprint image having a second largest region overlapping the fingerprint image.

11. The method of claim 1, further comprising:
    obtaining the result of the first matching based on at least one of the size of the first matching region between the fingerprint image and the first registered fingerprint image and the similarity between the fingerprint image and the first registered fingerprint image corresponding to the first matching region; and obtaining the result of the second matching based on at least one of the size of the second matching region between the fingerprint image and the second registered fingerprint image and the similarity between the fingerprint image and the second registered fingerprint image corresponding to the second matching region.

12. The method of claim 1, wherein the first registered fingerprint image is determined, among registered fingerprint images, based on a registered fingerprint image having a largest region overlapping the fingerprint image.

13. A non-transitory computer-readable storage medium storing instructions that are executable by a processor to perform a method of verifying a fingerprint, the method comprising:

performing a first matching between a fingerprint image and a first registered fingerprint image;

determining whether a first condition for a verification success is satisfied based on a result of the first matching in which a first score of the first matching is greater than a first threshold value;

in response to the first condition being not satisfied, determining whether a second condition for a verification fail is satisfied based on the result of the first matching in which the first score of the first matching is less than a second threshold value that is less than the first threshold value;

in response to the second condition being not satisfied, performing a second matching between the fingerprint image and a second registered fingerprint image, the second registered fingerprint image being different from the first registered fingerprint image; and verifying the fingerprint based on the result of the first matching and a result of the second matching, wherein the verifying the fingerprint further comprises:

assigning a second score to the fingerprint image based on a size of each of a first matching region of the first matching and a second matching region of the second matching, and a similarity assigned to each of the first matching region and the second matching region; and verifying the fingerprint based on the second score.

14. An apparatus for verifying a fingerprint, the apparatus comprising:

a sensor configured to obtain a fingerprint image; and a processor configured to verify the fingerprint based on the fingerprint image, wherein the processor is further configured to:

perform a first matching between the fingerprint image and a first registered fingerprint image;

determine whether a first condition for a verification success is satisfied based on a result of the first matching in which a first score of the first matching is greater than a first threshold value;

in response to the first condition being not satisfied, determine whether a second condition for a verification fail is satisfied based on the result of the first matching in which the first score of the first matching is less than a second threshold value that is less than the first threshold value;

in response to the second condition being not satisfied, perform a second matching between the fingerprint image and a second registered fingerprint image, the second registered fingerprint image being different from the first registered fingerprint image; and verify the fingerprint based on the result of the first matching and a result of the second matching, wherein the verifying the fingerprint further comprises:

assigning a second score to the fingerprint image based on a size of each of a first matching region of the first matching and a second matching region of the second matching, and a similarity assigned to each of the first matching region and the second matching region; and verifying the fingerprint based on the second score.

15. The apparatus of claim 14, wherein the processor is further configured to:

perform a first alignment between the fingerprint image and the first registered fingerprint image;

determine the first matching region between the fingerprint image and the first registered fingerprint image based on a result of the first alignment; and obtain the result of the first matching based on at least one of the size of the first matching region and the similarity between the fingerprint image and the first registered fingerprint image corresponding to the first matching region.

16. The apparatus of claim 15, wherein the second registered fingerprint image is determined to be at least one of registered fingerprint images overlapping a region of the fingerprint image other than the first matching region.

17. The apparatus of claim 16, wherein the second registered fingerprint image is determined based on the result of the first matching and a positional relationship between the registered fingerprint images.

18. The apparatus of claim 14, wherein the processor is further configured to:

perform a second alignment between the fingerprint image and the second registered fingerprint image;

determine the second matching region between the fingerprint image and the second registered fingerprint image based on a result of the second alignment; and obtain the result of the second matching based on at least one of the size of the second matching region and the similarity between the fingerprint image and the second registered fingerprint image corresponding to the second matching region.

19. The apparatus of claim 18, wherein the processor is further configured to:

determine a position of the fingerprint image in a coordinate system for the second registered fingerprint image; and perform the second alignment between the fingerprint image and the second registered fingerprint image based on the determined position of the fingerprint image.

* * * * *